US007454321B1

(12) United States Patent
Rai

(10) Patent No.: US 7,454,321 B1
(45) Date of Patent: Nov. 18, 2008

(54) ROBUST, OPTIMAL SUBSONIC AIRFOIL SHAPES

(75) Inventor: Man Mohan Rai, Los Altos, CA (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 377 days.

(21) Appl. No.: 11/173,447

(22) Filed: Jul. 1, 2005

Related U.S. Application Data

(63) Continuation-in-part of application No. 10/043,044, filed on Jan. 7, 2002, now Pat. No. 6,961,719.

(51) Int. Cl.
*G06G 7/48* (2006.01)

(52) U.S. Cl. .................. 703/7; 703/1; 703/2; 703/6; 703/9

(58) Field of Classification Search ................. 703/1, 703/2, 7, 9, 6
See application file for complete search history.

(56) References Cited

U.S. PATENT DOCUMENTS

| | | | |
|---|---|---|---|
| 4,885,686 A | 12/1989 | Vanderbei | |
| 4,924,386 A | 5/1990 | Freedman et al. | |
| 5,136,538 A | 8/1992 | Karmarkar et al. | |
| 5,813,832 A * | 9/1998 | Rasch et al. | 415/200 |
| 7,043,462 B2 | 5/2006 | Jin et al. | |
| 2001/0031076 A1 | 10/2001 | Campanini et al. | |
| 2003/0040904 A1 | 2/2003 | Whitman et al. | |
| 2003/0078850 A1 | 4/2003 | Hartman et al. | |

OTHER PUBLICATIONS

M. M. Rai and N. K. Madavan, "Aerodynamic Design Using Neural Networks", AIAA Jour., vol. 38 (2000) pp. 173-182.
V. N. Vapnik, "An Overview of Statistical Learning Theory", IEEE Trans. on Neural Networks, vol. 10 (1999) pp. 988-999.
J. A. K. Suykens et al, Recurrent Least Squares Support Vector Machines, Jul. 2000, IEEE, 1057-7122/00, 1109-1114.
Pascal Vincent et al, A Neural Support Vector Network Architecture with Adaptive Kernels, 2000, IEEE, 0-7695-0619-4, 187-19.
Conway, et al., Voronoi Regions of Lattices, Second Moments of Polytopes, and Quantization, IEEE Transactions on Information Theory, Mar. 1982, 211-226, IT-28-2, IEEE.
USPTO Office Action, Mar. 31, 2004, 17 pages, parent case, U.S. Appl. No. 10/043,044, filed Jan. 7, 2002.
USPTO Office Action, Aug. 1, 2006, 6 pages, divisional of parent case, U.S. Appl. No. 11/274,744, filed Nov. 14, 2005.

* cited by examiner

*Primary Examiner*—Paul L Rodriguez
*Assistant Examiner*—Jason Proctor
(74) *Attorney, Agent, or Firm*—John F. Schipper; Robert M. Padilla

(57) ABSTRACT

Method system, and product from application of the method, for design of a subsonic airfoil shape, beginning with an arbitrary initial airfoil shape and incorporating one or more constraints on the airfoil geometric parameters and flow characteristics. The resulting design is robust against variations in airfoil dimensions and local airfoil shape introduced in the airfoil manufacturing process. A perturbation procedure provides a class of airfoil shapes, beginning with an initial airfoil shape.

12 Claims, 19 Drawing Sheets

ROBUST, OPTIMAL SUBSONIC AIRFOIL SHAPES

CROSS REFERENCE TO RELATED APPLICATIONS

This application is a Continuation In Part of prior application Ser. No. 10/043,044, filed Jan. 7, 2002 now U.S. Pat. No. 6,961,719.

ORIGIN OF THE INVENTION

This invention was made, in part, by an employee of the U.S. government. The U.S. government has the right to make, use and/or sell the invention described herein without payment of compensation therefor, including but not limited to payment of royalties.

FIELD OF THE INVENTION

This invention relates to design of optimal shapes of airfoils, such as turbine blades, operating in subsonic flow regimes.

BACKGROUND OF THE INVENTION

An airfoil, such as a propeller blade or a turbine vane or blade (collectively referred to herein as an "airfoil"), may be used in a variety of environments, including different ambient temperatures, gas densities, gas compositions, gas flow rates, pressures and motor rpm. An airfoil shape that is optimized for one environment may have sharply limited application in another environment. For example, vortex shedding at a trailing edge of a rotating airfoil may be tolerable for the nominal design but may become unacceptably high, resulting in airfoil cracking when the manufactured airfoil differs slightly from the specifications. The airfoil design may be constrained by certain physical and/or geometrical considerations that limit the range of airfoil parameters that can be incorporated in the design.

Present designs sometimes lead to extensive airfoil cracking or other failure modes after operation over modest time intervals of the order of a few hours. For example, the vane trailing edge fillet radii for the Space Shuttle Main Engine L.P.O.T.P. (low pressure oxidizer turbopump) have occasionally been observed to develop cracks having a mean crack length of about 0.15 inches. This cracking behavior may arise from strong vortex shedding at the vane trailing edges, compounded by the relatively thin vane trailing edges and/or from the presence of small imperfections in the airfoil trailing edge shape formed in the airfoil manufacturing process.

What is needed is a method for determination of an optimal airfoil shape that provides an approximately optimal shape for a class of environments. This airfoil must be robust enough to operate satisfactorily in these environments and with any reasonable differences from manufacturing specs, and satisfies the constraints imposed on the design. Preferably, the method should be flexible and should be extendible to a larger class of requirements and to changes in the constraints imposed.

SUMMARY OF THE INVENTION

These needs are met by the invention, which provides a method, and a product produced by the method, for determination of a robust, optimal subsonic airfoil shape, beginning with an arbitrary initial airfoil shape and imposing the necessary constraints on the design. In one embodiment, the method implements the following steps or processes: (1) provide a specification of a desired pressure value at each of a sequence of selected locations on a perimeter of a turbine airfoil; (2) provide an initial airfoil shape; (3) provide a statement of at least one constraint that a final airfoil shape must conform to; (4) use computational fluid dynamics ("CFD") to estimate a pressure value at each of the selected perimeter locations for the initial airfoil shape; (5) use computational fluid dynamics (CFD) to determine the pressure distribution for airfoil shapes that are small perturbations to the initial airfoil shape; (6) use an estimation method, such as a neural network, a support vector machine, or a combination thereof, to construct a response surface that models the pressure distribution as a function of the airfoil shape, using the CFD data; (7) use an optimization algorithm to search the response surface for the airfoil shape having a corresponding pressure distribution that is closer to the specified target pressure distribution; and (8) provide at least one of an alphanumeric description and a graphical description of the modified airfoil shape.

The constraint(s) may be drawn from the following group or may be one or more other suitable constraints: vortex shedding from the trailing edge of the airfoil is no greater than a selected threshold value; a difference between any resonant frequency of the airfoil and the vortex shedding frequency is at least equal to a threshold frequency difference; mass of the airfoil is no larger than a threshold mass value; and pressure value at each of a sequence of selected locations along a perimeter of the airfoil differs from a corresponding reference pressure value by no more than a threshold pressure difference value.

DESCRIPTION OF BEST MODES OF THE INVENTION

Figure 1:
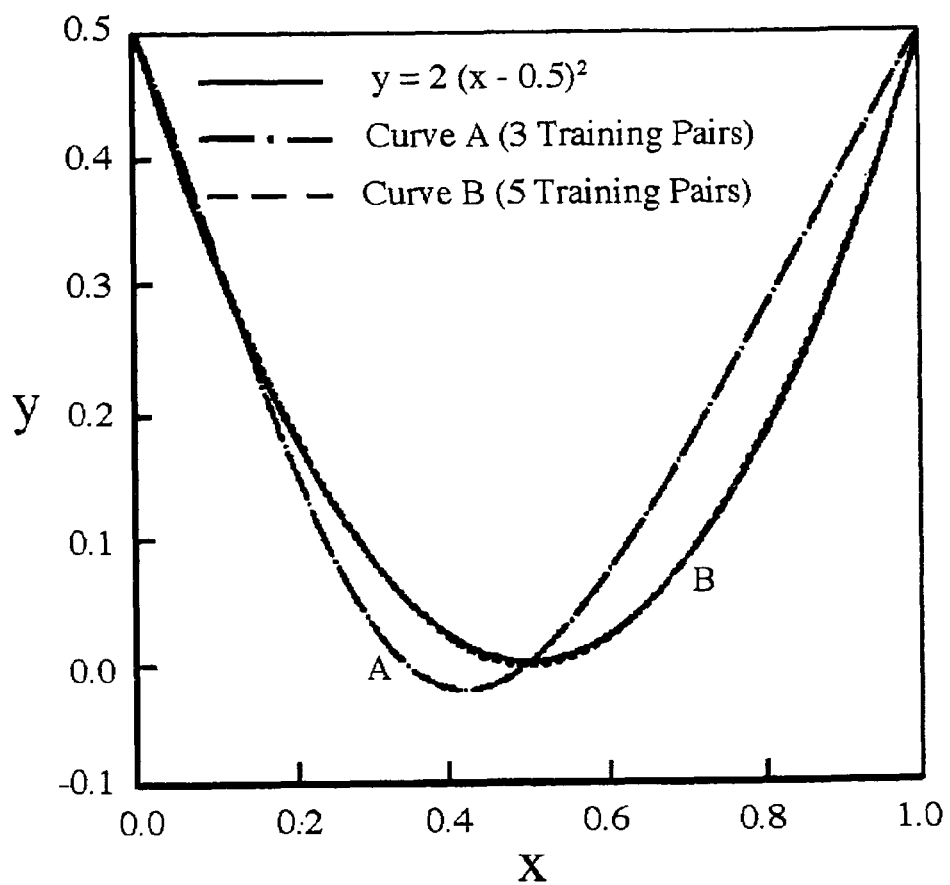
FIG. 1 graphically illustrates an improvement in match of a polynomial, where an increased number of training pairs is included in a simple NN analysis.
Figure 2:
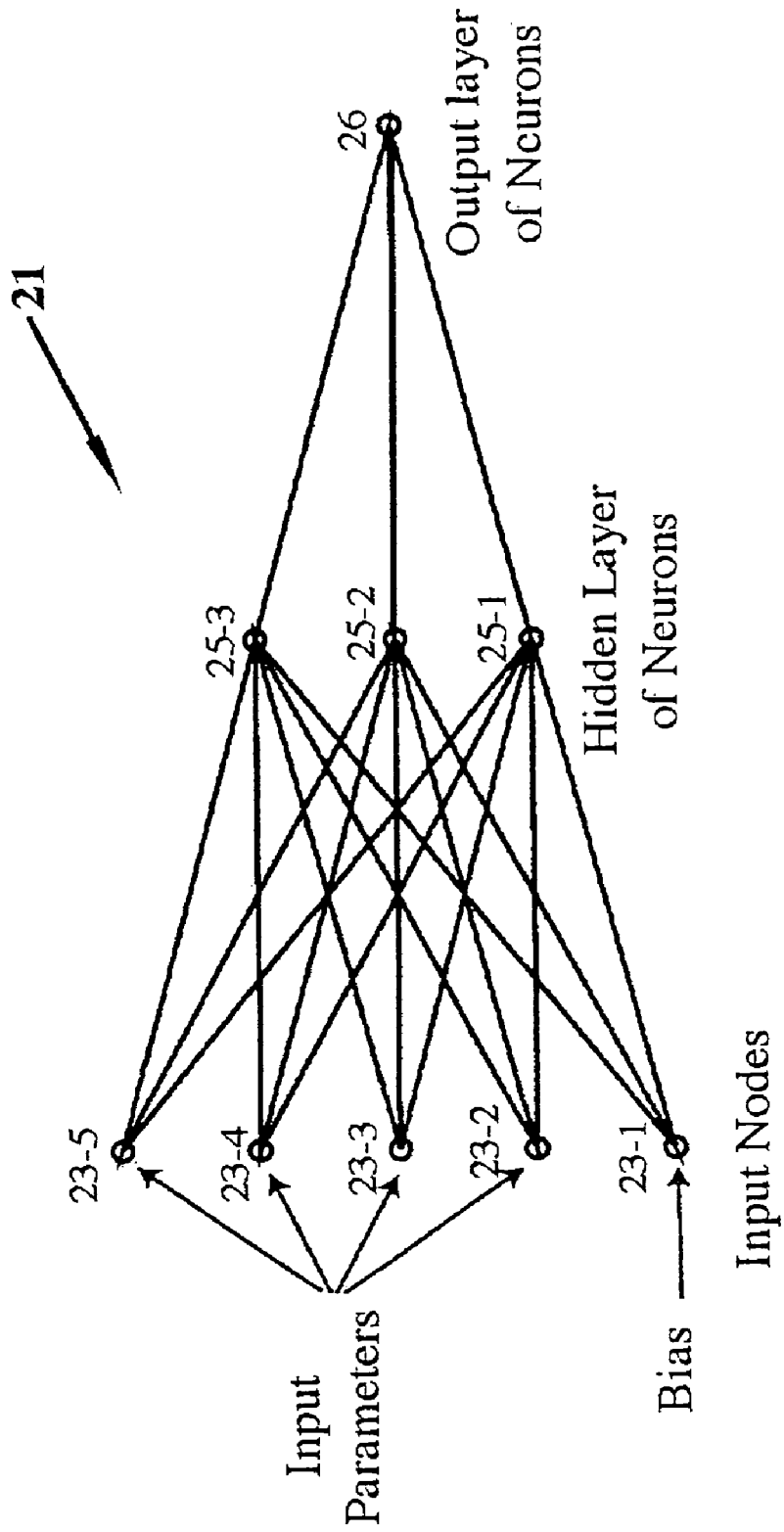
FIG. 2 is a schematic view of a three-layer feed-forward neural net in the prior art.

Consider a feed-forward neural network ("NN") 21 having an input layer with nodes 23-$m$ ($m=1, \ldots, 5$), a hidden layer with nodes 25-$n$ ($n=1, 2, 3$), and an output node 26, as illustrated schematically in FIG. 2. The first input layer node 23-1 has a bias input value 1, in appropriate units. The remaining nodes of the input layer are used to enter selected parameter values as input variables, expressed as a vector $p=(p_1, \ldots, p_M)$, with $M \geq 1$. Each node 25-$n$ of the hidden layer is associated with a nonlinear activation function $$q_n = \Phi_n\left(\sum_{m=0}^{M} C_{nm} \cdot p_m\right) \quad (1)$$

of a weighted sum of the parameter values $p_m$, where $C_{nm}$ is a connection weight, which can be positive, negative or zero, linking an input node 23-$m$ with a hidden layer node 25-$n$. The output of the network 21 is assumed for simplicity, initially, to be a single-valued scalar, $$r = \sum_{n=1}^{N} D_n \cdot q_n. \quad (2)$$

FIG. 2 illustrates a conventional three-layer NN, with an input layer, a hidden layer and an output layer that receives and combines the resulting signals produced by the hidden layer.

It is known that NN approximations of the format set forth in Eqs. (1) and (2) are dense in the space of continuous functions when the activation functions $\Phi_n$ are continuous sigmoidal functions (monotonically increasing functions, with a selected lower limit, such as 0, and a selected upper limit, such as 1). Three commonly used sigmoidal functions are $$\Phi(z) = 1/\{1 + \exp(-z)\}, \quad (3A)$$

$$\Phi(z) = (1 + \tan h(z))/2, \quad (3B)$$

$$\Phi(z) = \{\pi + 2 \cdot \tan^{-1}(z)\}/2\pi, \quad (3C)$$

$$z = \sum_{m=0}^{M} C_{nm} \cdot p_m. \quad (4)$$

Other sigmoidal functions can also be used here. In the context of design optimization, a trained NN represents a response surface, and the NN output is the objective function. In multiple objective optimization, different NNs can be used for different objective functions. A rapid training algorithm that determines the connection weights $C_{nm}$ and coefficients $D_n$ is also needed here.

The approach set forth in the preceding does reasonably well in an interpolative mode, that is, in regions where data points (parameter value vectors) are reasonably plentiful. However, this approach rarely does well in an extrapolative mode. In this latter situation, a precipitous drop in estimation accuracy may occur as one moves beyond the convex hull defined by the data point locations. In part, this is because the sigmoidal functions are not the most appropriate basis functions for most data modeling situations. Where the underlying function(s) is a polynomial in the parameter values, a more appropriate set of basis functions is a set of Legendre functions (if the parameter value domain is finite), or a set of Laguerre or Hermite functions (if the parameter value domain is infinite). Where the underlying function(s) is periodic in a parameter value, a Fourier series may be more appropriate to represent the variation of the function with that parameter.

Two well known approaches are available for reducing the disparity between an underlying function and an activation function. A first approach, relies on neural nets and uses appropriate functions of the primary variables as additional input signals for the input nodes. These functions simplify relationships between neural net input and output variables but require a priori knowledge of these relationships, including specification of all the important nonlinear terms in the variables. For example, a function of the (independent) parameter values x and y, such as $$h(x,y) = a \cdot x^2 + b \cdot x \cdot y + c \cdot y^2 + d \cdot x + e \cdot y + f, \quad (5)$$

where a, b, c, d, e and f are constant coefficients, would be better approximated if the terms x, y, $x^2$, x·y and $y^2$ are all supplied to the input nodes of the network 21. However, in a more general setting with many parameters, this leads to a very large number of input nodes and as-yet-undetermined connection weights $C_{nm}$.

A second approach, referred to as a support vector machine (SVM), provides a nonlinear transformation from the input space variables $p_m$ into a feature space that contains the original variables $p_m$ and the important nonlinear combinations of such terms (e.g., $(p_1)^2$, $(p_1)(p_2)^3(p_M)^2$ and $\exp(p_2)$) as coordinates. For the example function $h(p_1,p_2)$ set forth in Eq. (5), the five appropriate feature space coordinates would be $p_1$, $p_2$, $(p_1)^2$, $p_1 \cdot p_2$ and $(p_2)^2$. Very high dimensional feature spaces can be handled efficiently using kernel functions for certain choices of feature space coordinates. The total mapping between the input space of individual variables (first power of each parameter $p_m$) and the output space is a hyperplane in feature space. For a model that requires only linear terms and polynomial terms of total degree 2 (as in Eq. (5)), in the input space variables, the model can be constructed efficiently using kernel functions that can be used to define inner products of vectors in feature space. However, use of an SVM requires a priori knowledge of the functional relationships between input and output variables.

The mapping between the input space parameters and the output function is defined using a kernel function and certain Lagrange multipliers. The Lagrange multipliers are obtained by maximizing a function that is quadratic and convex in the multipliers, the advantage being that every local minimum is also a global minimum. By contrast, a neural net often exhibits numerous local minima of the training error(s) that may not be global minima. However, several of these local minima may provide acceptable training errors. The resulting multiplicity of acceptable weight vectors can be used to provide superior network generalization, using a process known as network hybridization. A hybrid network can be constructed from the individual trained networks, without requiring data re-sampling techniques.

An attractive feature of a neural net, vis-a-vis an SVM, is that the coordinates used in a feature space do not have to be specified (e.g., via kernel functions). However, use of an SVM, in contrast to use of a neural net, allows one to introduce features spaces with a large number of dimensions, without a corresponding increase in the number of coefficients.

A primary contribution of the present invention is to provide a mechanism, within the NN component, for determining at least the coordinate (parameter) combinations needed to adequately define the feature space for an SVM, without requiring detailed knowledge of the relationships between input parameters and the output function.

Figure 3:
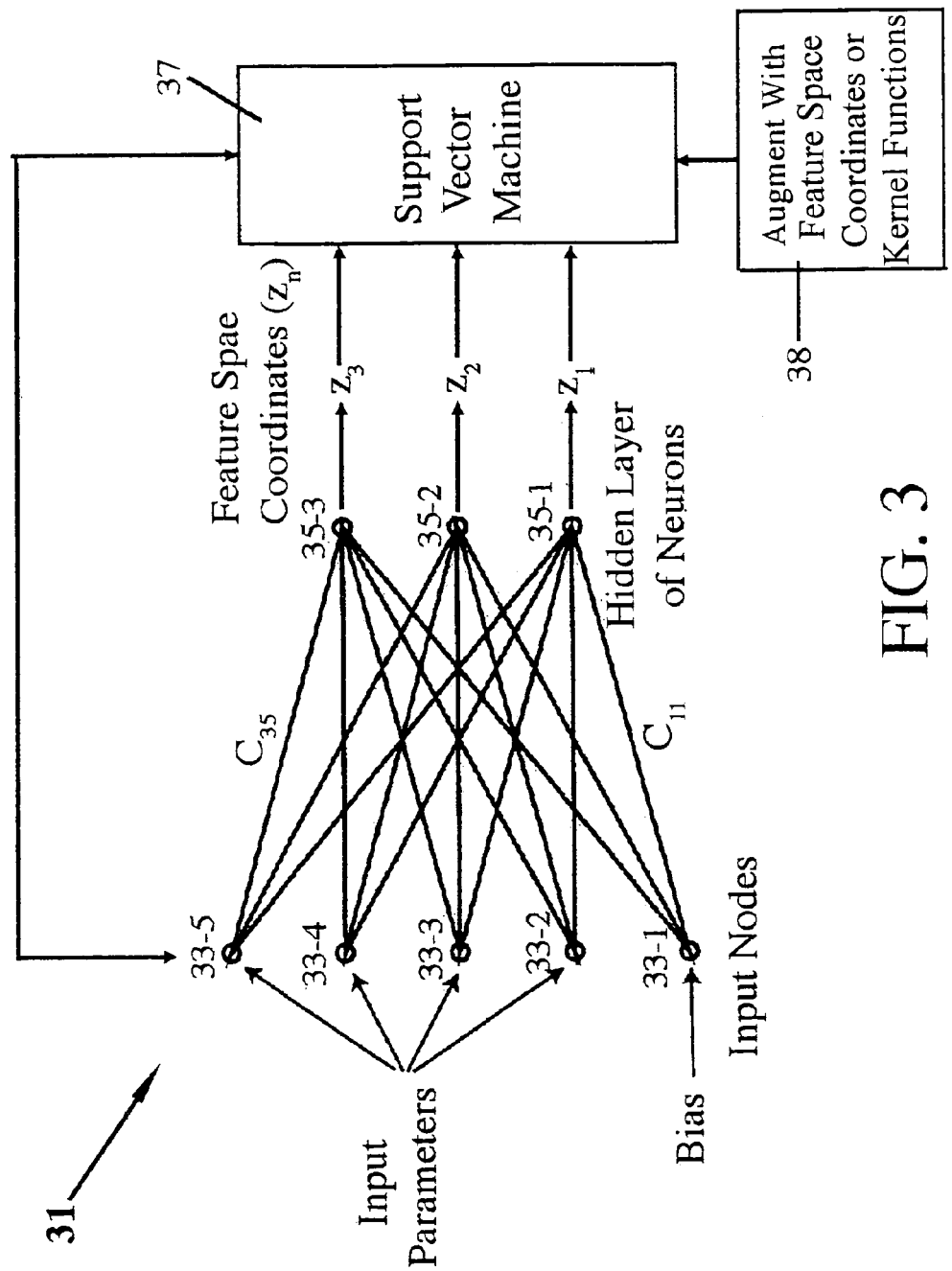
FIG. 3 is a schematic view of a two-layer feed-forward NN/SVM (neural network/support vector machine) system according to the invention.

FIG. 3 is a schematic view of an NN/SVM (neural network/support vector machine) system 31, including an NN component and an SVM component, according to the invention. The system 31 includes input layer nodes 33-$i$ ($i$=1, 5) and hidden layer nodes 35-$j$ ($j$=1, 2, 3). FIG. 3 also indicates some of the connection weights associated with connections of the input layer terminals and the hidden layer terminals. More than one hidden layer can be provided. The hidden layer output signals are individually received at an SVM 37 for further processing, including computation of a training error. If the computed training error is too large, one or more of the connection weights is changed, and the (changed) connection weights are returned to the NN component input terminals for repetition of the procedure. Optionally, the SVM 37 receives one or more user-specified augmented inner product or kernel prescriptions (discussed in the following), including selected combinations of coordinates to be added, from an augmentation source 38.

Figure 4:
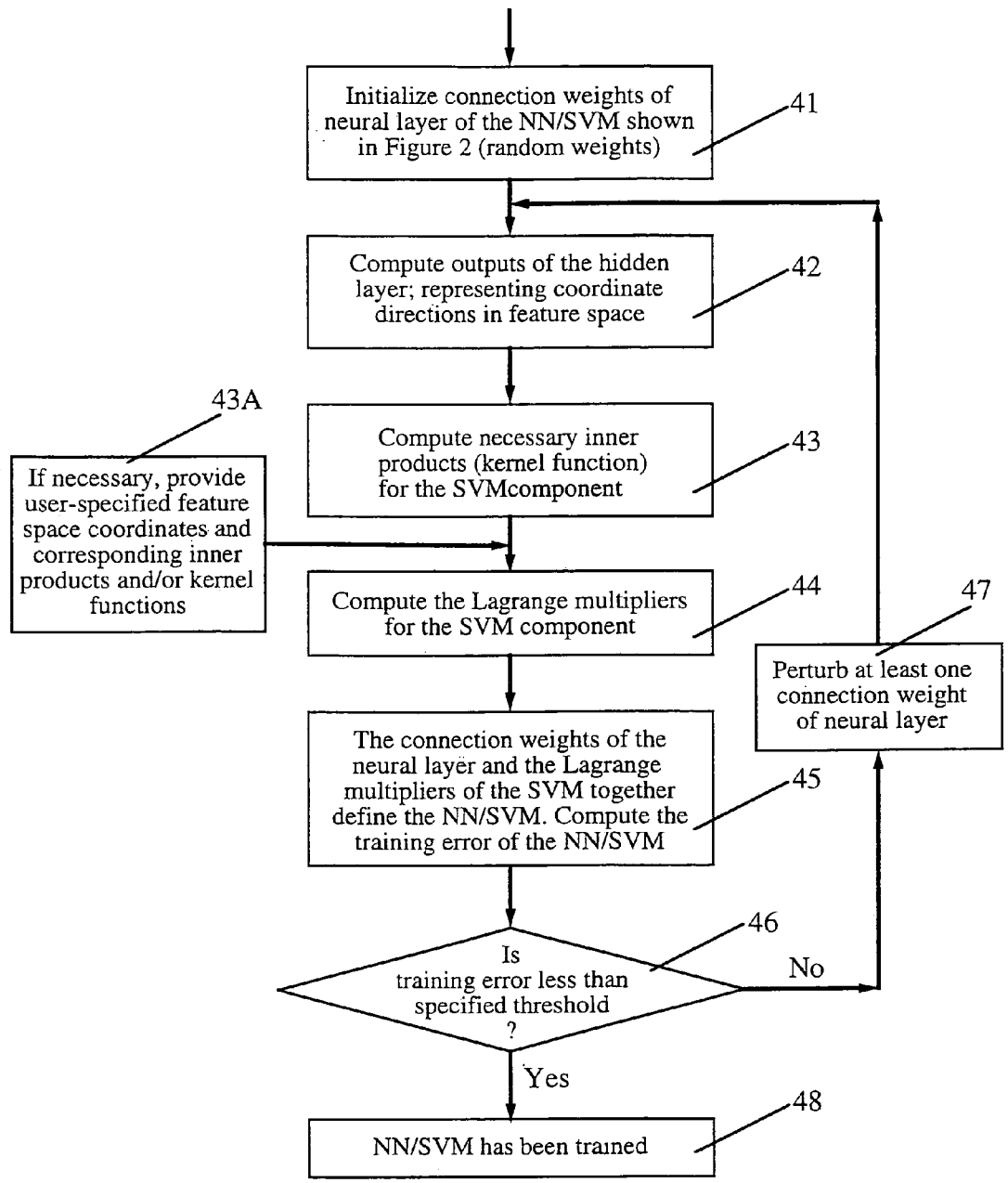
FIG. 4 is a flow chart of an overall procedure for practicing the invention using an NN/SVM system.

FIG. 4 is a flow chart illustrating an overall procedure according to the invention. In step 41, the system provides (initial) values for connection weights $C_{nm}$ for the input layer-hidden layer connections. These weights may be randomly chosen. The input signals may be a vector of parameter values $p=(p_1, \ldots, p_M)$ ($M$=5 in FIG. 3) in parameter space. In step 42, output signals from the hidden layer are computed to define the feature space for the SVM. The NN component of the system will provide appropriate combinations of the parameter space coordinates as new coordinates in a feature space for the SVM (e.g., $u_1=p_1$, $u_2=p_2$, $u_3=p_1^2$, $u_4=p_1 \cdot p_2$, $u_5=p_2^2$, from Eq. (5))

In step 43, feature space inner products that are required for the SVM are computed. In step 43A, user-specified feature space coordinates and corresponding inner products and kernel functions are provided. Note that the feature space is a vector space with a corresponding inner product.

In step 44, a Lagrange functional is defined and minimized, subject to constraints, to obtain Lagrange multiplier values for the SVM. In step 45, the NN connection weights and the Lagrange multiplier coefficients are incorporated and used to compute a training error associated with this choice of values within the NN/SVM.

In step 46, the system determines if the training error is no greater than a specified threshold level. If the answer to the query in step 46 is "no", the system changes at least one connection weight, in step 47, preferably in a direction that is likely to reduce the training error, and repeats steps 42-46. If the answer to the query in step 46 is "yes", the system interprets the present set of connection weights and Lagrange multiplier values as an optimal solution of the problem, in step 48.

Note that steps 42-48 can be embedded in an optimization loop, wherein the connection weights are changed according to the rules of the particular optimization method used.

The hybrid NN/SVM system relies on the following broadly stated actions: (1) provide initial random (or otherwise specified) connection weights for the NN; (2) use the activation function(s) and the connection weights associated with each hidden layer unit to construct inner products for the SVM; (3) use the inner products to compute the Lagrange multiplier values; (4) compute a training error associated with the present values of the connection weights and Lagrange multiplier values; (5) if the training error is too large, change at least one connection weight and repeat steps (2)-(4); (6) if the training error is not too large, accept the resulting values of the connection weights and the Lagrange multiplier values as optimal.

This method has several advantages over a conventional SVM approach. First, coordinates that must be specified a priori in the feature space for a conventional SVM are determined by the NN component in an NN/SVM system. The feature space coordinates are generated by the NN component to correspond to the data at hand. In other words, the feature space provided by the NN component evolves to match or correspond to the data. A feature space that evolves in this manner is referred to as "data-adaptive." The feature space coordinates generated by the NN component can be easily augmented with additional user-specified feature space coordinates (parameter combinations) and kernel functions.

Second, use of activation functions that are nonlinear functions of the connection weights in the NN component reintroduces the possibility of multiple local minima and provides a possibility of hybridization without requiring data resampling.

The feature spaces generated by the NN hidden layer can be easily augmented with high-dimensional feature spaces without requiring a corresponding increase in the number of connection weights. For example, a polynomial kernel containing all monomials and binomials (degrees one and two) in the parameter space coordinates can be added to an inner product generated by the SVM component, without requiring any additional connection weights or Lagrange multiplier coefficients.

The NN/SVM system employs nonlinear optimization methods to obtain acceptable connection weights, but the weight vectors thus found are not necessarily unique. Many different weight vectors may provide acceptably low training errors for a given set of training data. This multiplicity of acceptable weight vectors can be used to advantage. If validation data are available, one can select the connection weight vector and resulting NN/SVM system with the smallest validation error. In aerodynamic design, this requires additional simulations that can be computationally expensive.

If validation data are not available, multiple trained NNs or NN/SVM systems can be utilized to create a hybrid NN/SVM. A weighted average of output signals from trained multiple NN/SVMs is formed as a new hybrid NN/SVM solution. Where the weights are equal, if errors for the N individual output solutions are uncorrelated and individually have zero mean, the least squares error of this new solution is a factor of N less than the average of the least squares errors for the N individual solutions. When the errors for the N individual output solutions are partly correlated, the hybrid solution continues to produce a least squares error that is smaller than the average of the least squares errors for the N individual solutions, but the difference is not as large. The N trained NN/SVMs used to form a hybrid system need not have the same architecture or be trained using the same training set.

Figure 5:
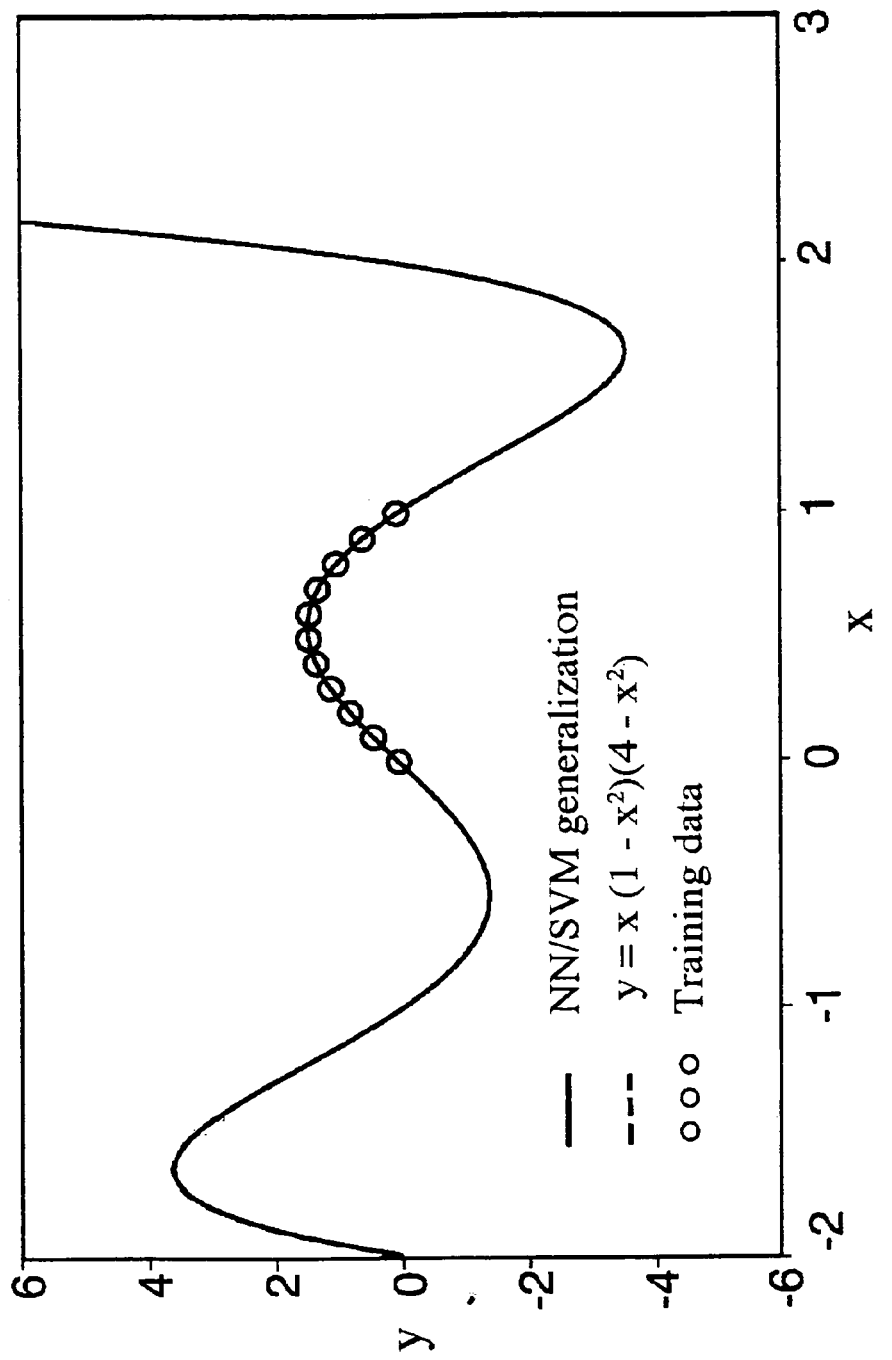
FIGS. 5, 6 and 7 graphically illustrate generalization curves obtained for a fifth degree polynomial, a logarithm function and an exponential function, respectively, using a hybrid NN/SVM analysis and 11 training values.

FIG. 5 graphically illustrates results of applying an NN/SVM analysis according to the invention to a six-parameter model, namely, an approximation to the fifth degree polynomial $y=x(1-x^2)(4-x^2)$. Data are provided at each of 11 training locations (indicated by small circles on the curve) in the domain of the variable x. After a few iterations of an NN/SVM analysis, the 11 training values, $(x_k, y_k)=(x_k, x_k(1-x_k^2)(4-x_k^2))$, provide the solid curve as a generalization, using the NN/SVM analysis. The dashed curve (barely visible in FIG. 5) is a plot of the original fifth order polynomial.

Figure 6:
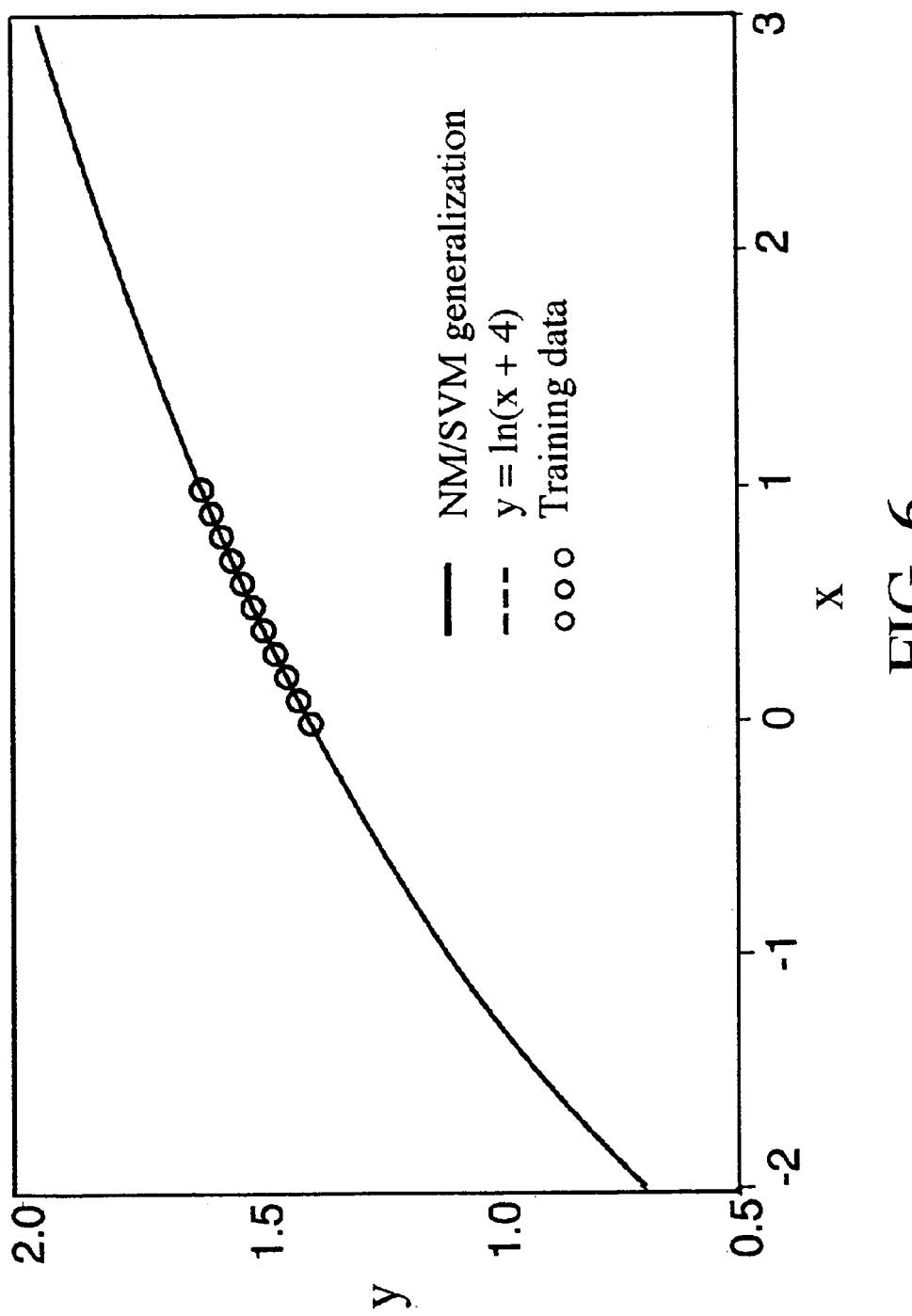

FIG. 6 graphically illustrates similar results of an application of the NN/SVM analysis to a logarithm function, $y=\ln(x+4)$, using 11 training values. The solid curve is the generalization provided by the NN/SVM analysis.

Figure 7:
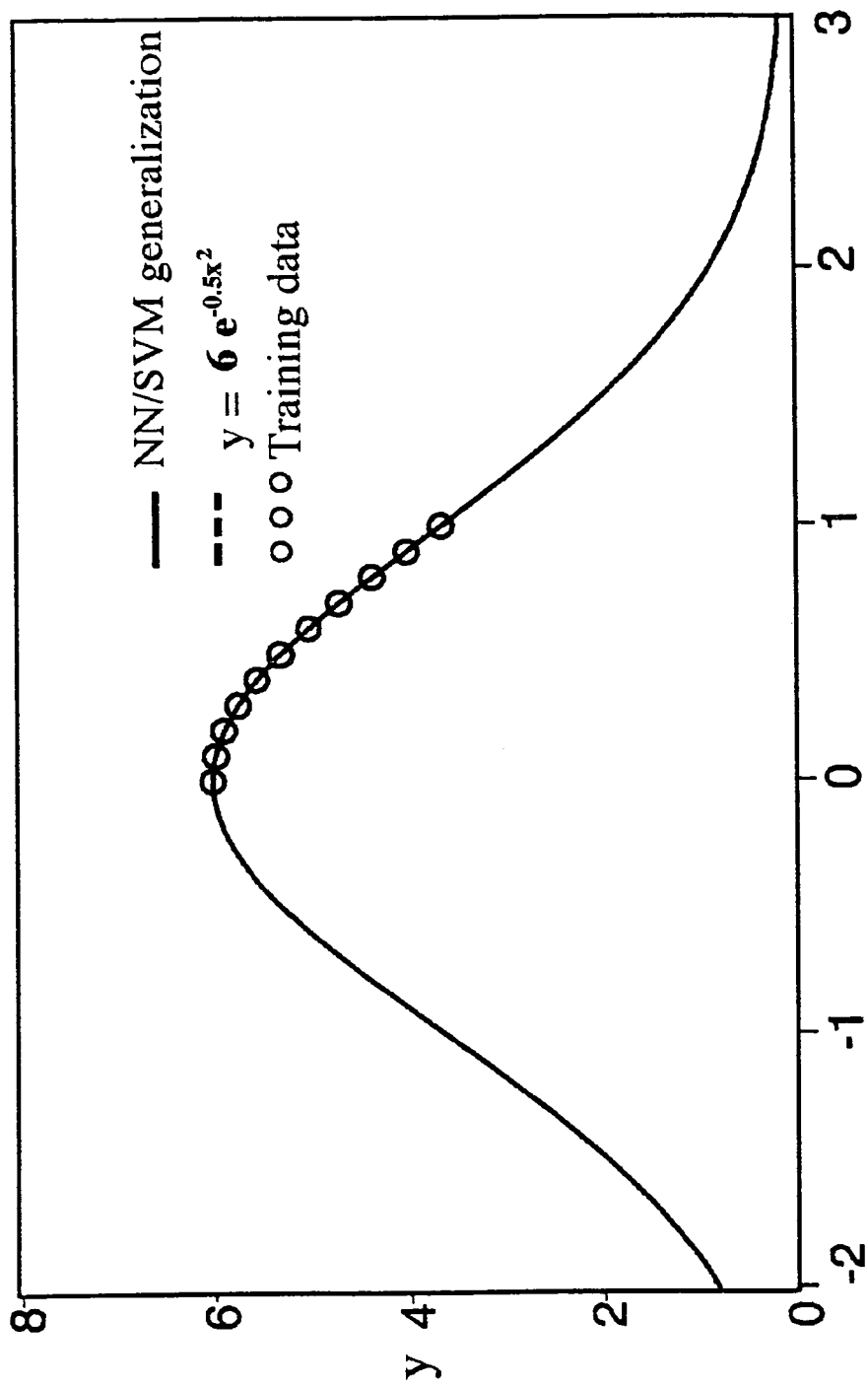

FIG. 7 graphically illustrates similar results of an application of the NN/SVM analysis to an exponential function, $y=6 \cdot \exp(-0.5 \cdot x^2)$, using 11 training values. The solid curve is the generalization provided by the NN/SVM analysis, using the 11 training values.

The generalization in each of FIGS. 5, 6 and 7 is vastly superior to corresponding generalizations provided by conventional approaches. In obtaining such a generalization, the same computer code can be used, with no change of parameters or other variables required.

Figure 8A:
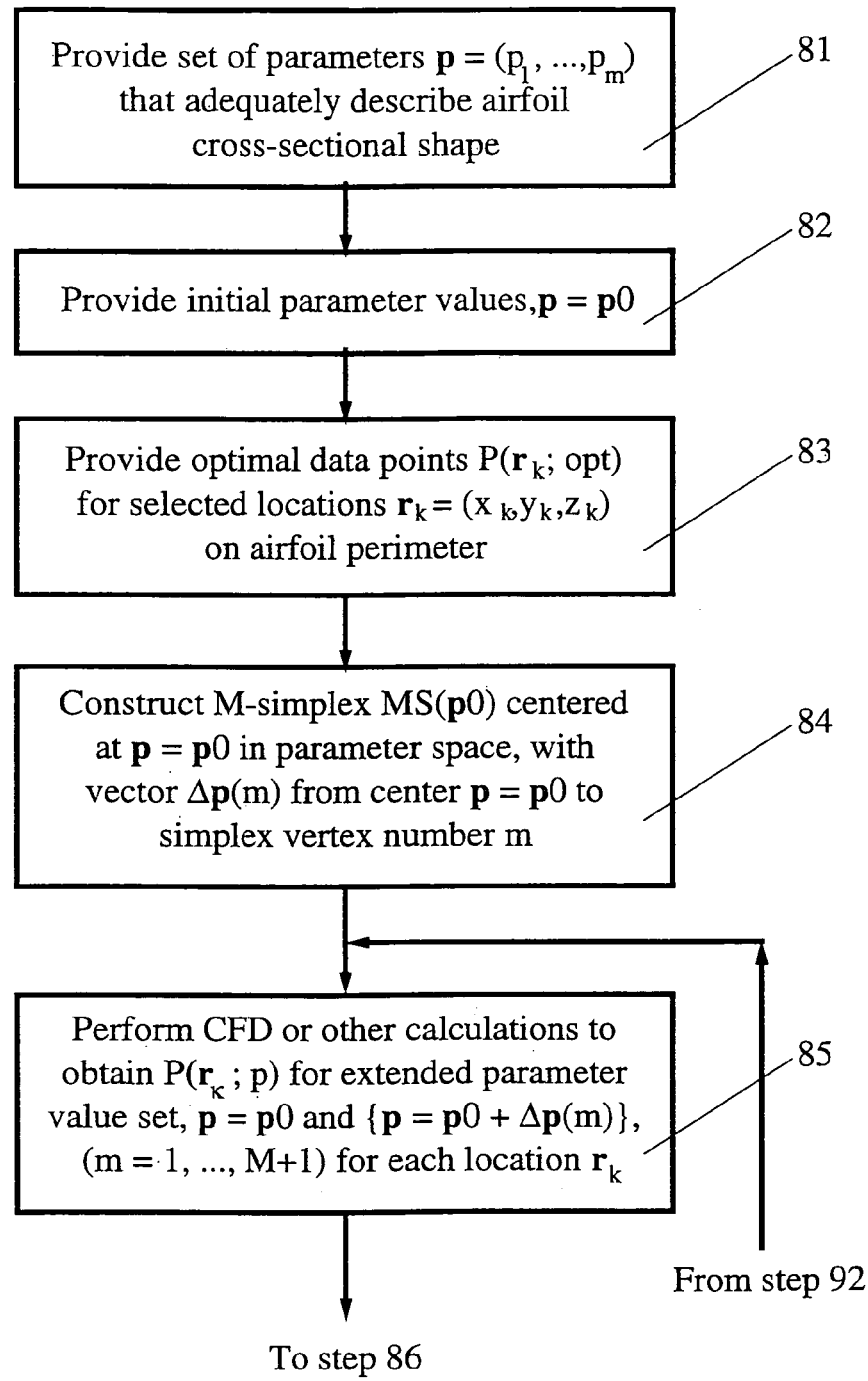
FIGS. 8A/8B/8C are a flow chart for a response surface method used in practicing the invention.
Figure 8B:
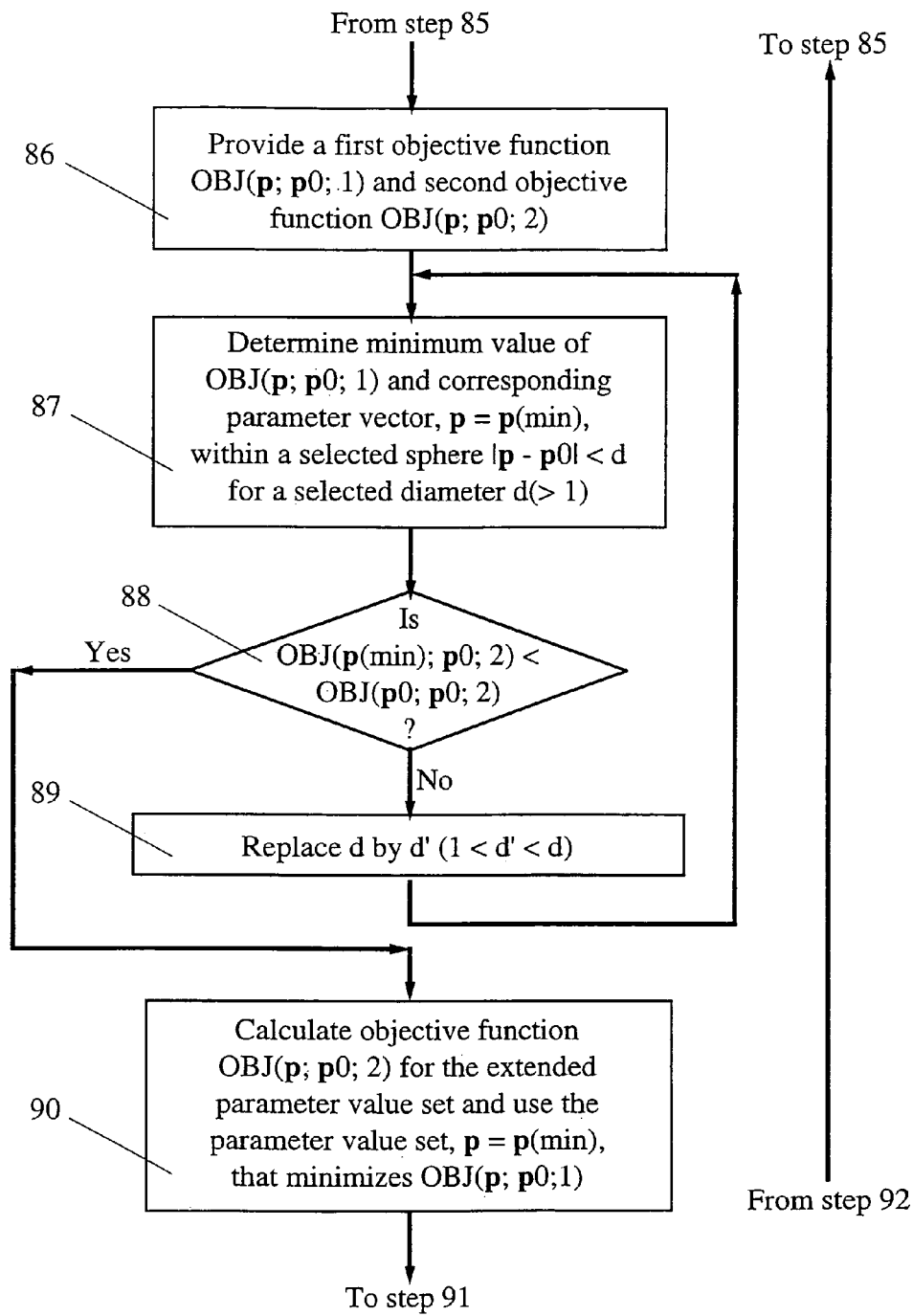
Figure 8C:
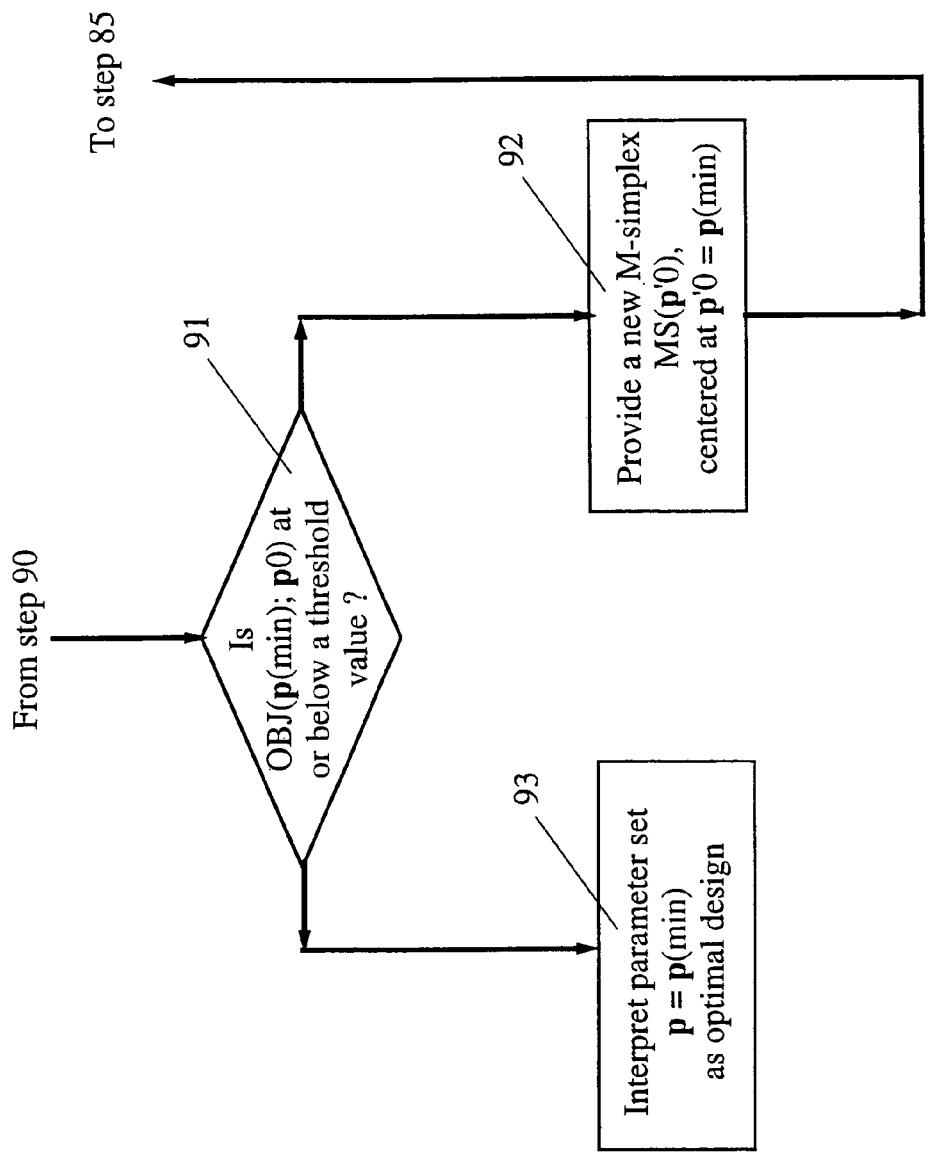

FIGS. 8A, 8B and 8C are a flow chart illustrating the application of a response surface methodology (RSM) used in this invention to obtain an optimal cross-sectional shape of an airfoil, as an example, where specified pressure values at selected locations on the airfoil perimeter are to be matched as closely as possible. In step 81, a set of parameters, expressed here as a vector $p=(p_1, p_M)$, is provided that adequately describes the airfoil cross-sectional shape (referred to as a "shape" herein), where M ($\geq 1$) is a selected positive integer. For example, the airfoil shape might be described by (1) first and second radii that approximate the shape of the airfoil at the leading edge and at the trailing edge, (2) four coefficients that describe a tension spline fit of the upper perimeter of the airfoil between the leading and trailing edge shapes, and (3) four coefficients that describe a tension spline fit of the lower perimeter of the airfoil between the leading and trailing edge shapes, a total of ten parameters. In a more general setting, the number M of parameters may range from 2 to 20 or more.

In step 82, initial values of the parameters, $p=p0$, are provided from an initial approximation to the desired airfoil shape.

In step 83, optimal data values $P(r_k; opt)$ (e.g., airfoil pressure values or airfoil heat transfer values) are provided at selected locations $r_k=(x_k, y_k, z_k)$ ($k=1, \ldots, K$) on the airfoil perimeter.

In step 84, an equilateral M-simplex, denoted MS(p0), is constructed, with a centroid or other selected central location at $p=p0$, in M-dimensional parameter space, with vertices lying on a unit radius sphere. Each of the M+1 vertices of the M-simplex MS(p0) is connected to the centroid, $p=p0$, by a vector $\Delta p(m)$ ($m=1, \ldots, M+1$) in parameter space. More than the M+1 vertices can be selected and used within the M-simplex. For example, midpoints of each of the M(M+1)/2 simplex edges can be added to the M+1 vertices. These additional locations will provide a more accurate NN/SVM model.

In step 85, a computational fluid dynamics (CFD) or other calculation is performed for an extended parameter value set, consisting of the parameter value vectors $p=p0$ and each of the M+1 M-simplex vertices, $p=p_{vert}=p0+\Delta p(m)$, to obtain a calculated pressure distribution $P(r_k; p_{vert})$ at each of the selected perimeter locations, $r=r_k$ for each of these parameter value sets. One hybrid NN/SVM is assigned to perform the analysis for all vertices in the M-simplex MS(p0) at each location $r_k$. That is, a total of K NN/SVM systems are used to model the overall pressure dependence on the parameters $p_m$. The calculated pressure distribution $P(r_k; p_{vert})$ and/or the airfoil can be replaced by any other suitable physical model, in aerodynamics or in any other technical field or discipline. Used together, the trained NN/SVM systems will provide the pressure distribution $P(r_k; p)$ for general parameter value vectors p.

In step 86, a first objective function, such as $$OBJ(p; p0; 1) = \sum_{k=1}^{K} w_k \{P(r_k; p) - P(r_k; opt)\}^2, \quad (6A)$$

is introduced, where $\{w_k\}$ is a selected set of non-negative weight coefficients.

In step 87, the minimum value of the first objective function OBJ(p;p0;1) and a corresponding parameter vector p=p(min) are determined for parameter vectors p within a selected sphere having a selected diameter or dilatation factor d, defined by $|p-p0| \leq d$ (with d typically in a range $1 < d \leq 10$), using a nonlinear optimization method. Other measures of specifying a "trust region" can also be used here.

In step 88, the system calculates a second objective function, which may be the first objective function or (preferably) may be defined as $$OBJ(p; p0; 2) = \sum_{k=1}^{K} w_k \{P(r_k; p; CFD) - P(r_k; opt)\}^2, \quad (6B)$$

where $P(r_k; p; CFD)$ is a pressure value computed using a CFD simulation, for p=p(min) and p=p0. The system then determines if OBJ(p(min);p0;2)<OBJ(p0;p0;2) for the intermediate minimum value parameter vector, p=p(min). One can use the first objective function OBJ(p;p0;1), defined in Eq. (6A), rather than the objective function OBJ(p;p0;2) defined in Eq. (6B), for this comparison, but the resulting inaccuracies may be large.

If the answer to the query in step 88 is "no" for the choice of dilatation factor d, the dilatation factor d is reduced to a smaller value d' ($1 < d' < d$), in step 89, and steps 88 and 89 are repeated until the approximation pressure values $\{P(r_k; p)\}_k$ for the extrapolated parameter value set provide an improved approximation for the optimal values for the same airfoil perimeter locations, $r=r_k$.

If the answer to the query in step 88 is "yes", the system moves to step 90, uses the (modified) objective function and uses the intermediate minimum-cost parameter value set, p=p(min), which may lie inside or outside the M-simplex MS(p0) in parameter space. Minimization of the objective function OBJ(p;p0) may include one or more constraints, which may be enforced using the well known method of penalty functions. The (modified) objective function definition in Eq. (6A) (or in Eq. (6B)) can be replaced by any other positive definite definition of an objective function, for example, by $$OBJ(p; p0) = \sum_{k=1}^{K} w_k |P(r_k; p) - P(r_k; opt)|^q, \quad (6C)$$

where the exponent q is a selected positive number.

The constraints imposed are also modeled using an NN/SVM system with an appropriate objective function incorporating these constraints, for example, as part of a simplex method as described in W.H. Press et al, *Numerical Recipes in C*, Second Edition, 1992, Cambridge University Press, pp. 430-438.

If the original parameter value set p has an insufficient number of parameters, this will become evident in the preceding calculations, and the (modified) objective function OBJ(p(min);p0) or OBJ(p(min);p0)* will not tend toward acceptably small numbers. In this situation, at least one additional parameter would be added to the parameter value set p and the procedure would be repeated. In effect, an NN/SVM procedure used in an RSM analysis will require addition of (one or more) parameters until the convergence toward a minimum value that is acceptable for an optimized design.

In step 91, the system determines if the (modified) objective function OBJ(p(min);p0)* is no greater than a selected threshold number (e.g., 1 or $10^{-4}$, in appropriate units). If the answer to the query in step 91 is "no", a new M-simplex MS(p'0) is formulated, in step 92, with p'0=p(min) as the new center, and steps 85-90 are repeated at least once. Each time, a new parameter value set, p=p(min), is determined that approximately minimizes the objective function OBJ(p;p'0).

If the answer to the query in step 91 is "yes", the system interprets the resulting parameter set, p=p(min), and the design described by this parameter set as optimal, in step 93. The method set forth in steps 81-93 is referred to herein as a response surface method.

Figure 9:
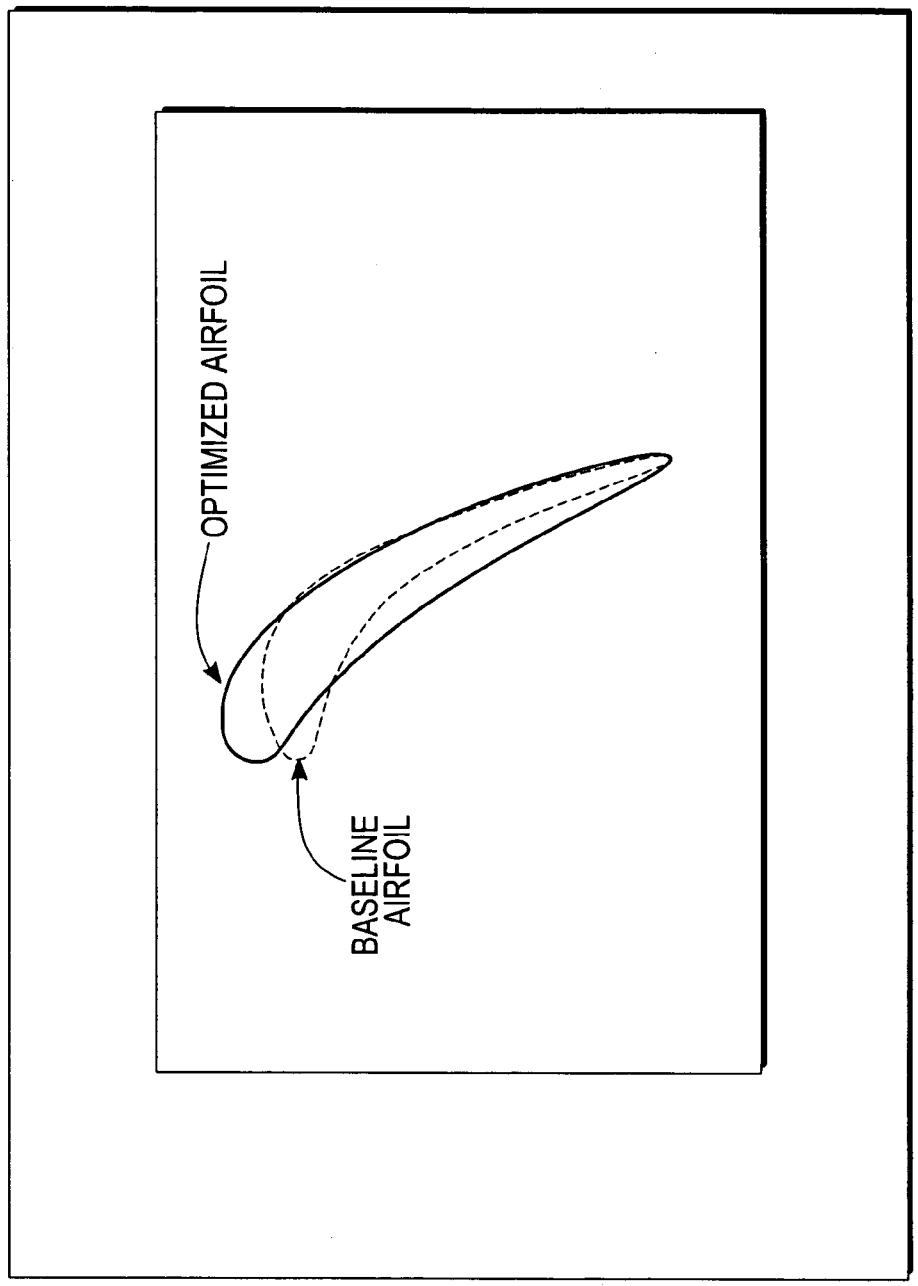
FIG. 9 illustrates an initial airfoil shape (dotted curve) and an optimized airfoil shape (solid curve) for a turbine blade produced by the invention, for a specified class of environments.

FIG. 9 graphically illustrates an initial turbine airfoil shape (dotted curve) and a corresponding optimized turbine airfoil (solid curve) that is produced according to the invention, where both airfoils have the same scale and are superimposed for ease of comparison. The optimized airfoil shape was determined, beginning with the initial airfoil shape and imposing the following constraints: (1) mass flow rate through a vane row is preserved; (2) flow exit angle from a vane row is preserved; (3) axial chord of a vane remains the same; (4) throat area remains the same; (5) no adverse effects on downstream rotor row; (6) no changes in airfoil manufacturing and assembly procedures; (7) vortex shedding from the airfoil trailing end (T-END) is reduced relative to the much larger vortex shedding associated with the initial airfoil shape; and maximization of trailing end angle Φ(TE) so that the optimized airfoil is thicker than the initial airfoil.

The constraint(s) imposed can include the preceding constraints and can include one or more of the following: vortex shedding from a trailing edge of the airfoil is no greater than a selected threshold value; a difference between any resonant frequency of the airfoil and vortex shedding frequency is at least equal to a threshold frequency difference; mass of the airfoil is no larger than a threshold mass value; pressure value at each of a sequence of selected locations along a perimeter of the airfoil differs from a corresponding reference pressure value by no more than a threshold pressure difference value; mass flow rate through each blade or vane is unchanged (from the value used for the initial airfoil shape). The optimal shape should be substantially invariant under scale change by a factor of ψ (ψ>0) and/or under rotation by a selected angle in a plane containing the drawing(s) in FIG. 9.

Figure 10:
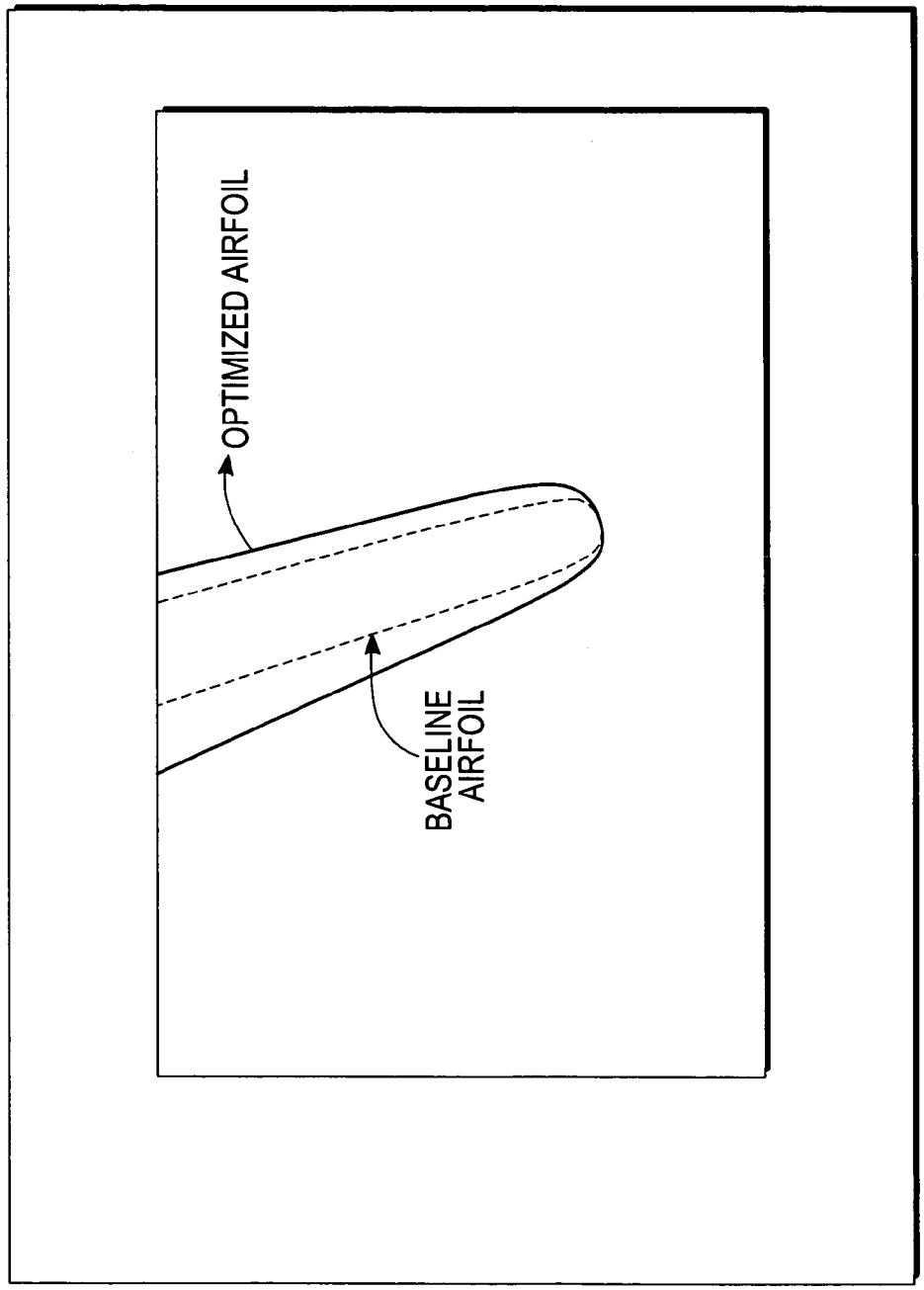
FIG. 10 compares the initial and optimized airfoil shape in more detail near the trailing edge of the blade illustrated in FIG. 9.

FIG. 10 graphically compares the trailing edge of the initial airfoil shape and of the optimized airfoil shape in greater detail. Indicating the increased thickness of the optimized airfoil shape at T-END. This increased thickness, adjacent to the trailing end and elsewhere, of the optimized airfoil shape increases the airfoil resonant frequency. The axial chord lengths for the initial airfoil shape and the optimized airfoil shape are approximately 0.4 inches. Note that the trailing edge of the optimal blade shape has a radius of curvature that is larger than the radius of curvature of the initial blade shape, for this example.

Figures 11A, 11B:
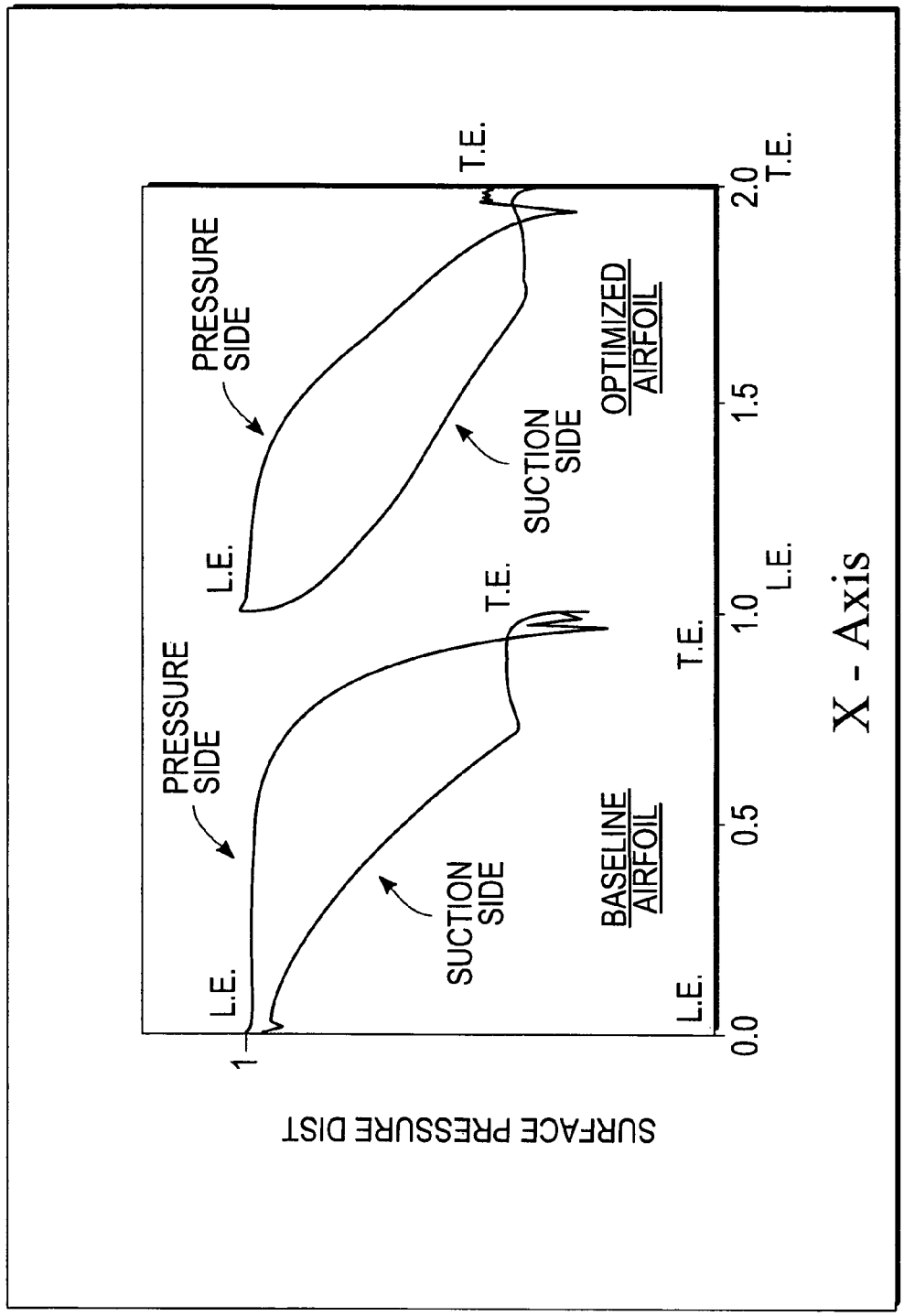
FIGS. 11A and 11B graphically illustrate surface pressure distribution for the initial and optimized airfoil shapes shown in FIG. 9.

FIGS. 11A and 11B graphically illustrate surface pressure distribution for the initial and optimized airfoil shapes, respectively, shown in FIG. 9. The difference between the upper and lower pressure curves at any given location x on the airfoil perimeter represents the local airfoil loading. For the initial airfoil shape, this load increases from nearly zero at the leading edge (x=0.0) to a maximum at about x=0.75 and decreases to small values near the trailing edge. Notice that the loading is inappropriate, because the load is smallest where the airfoil is thick (near the leading edge) and is largest where the airfoil is thin. The load for the optimal airfoil shape is much improved: the larger loads occur where the airfoil is thick, and thus stronger. The improved loading for the optimal airfoil shape also reduces vortex shedding amplitudes.

Figure 12:
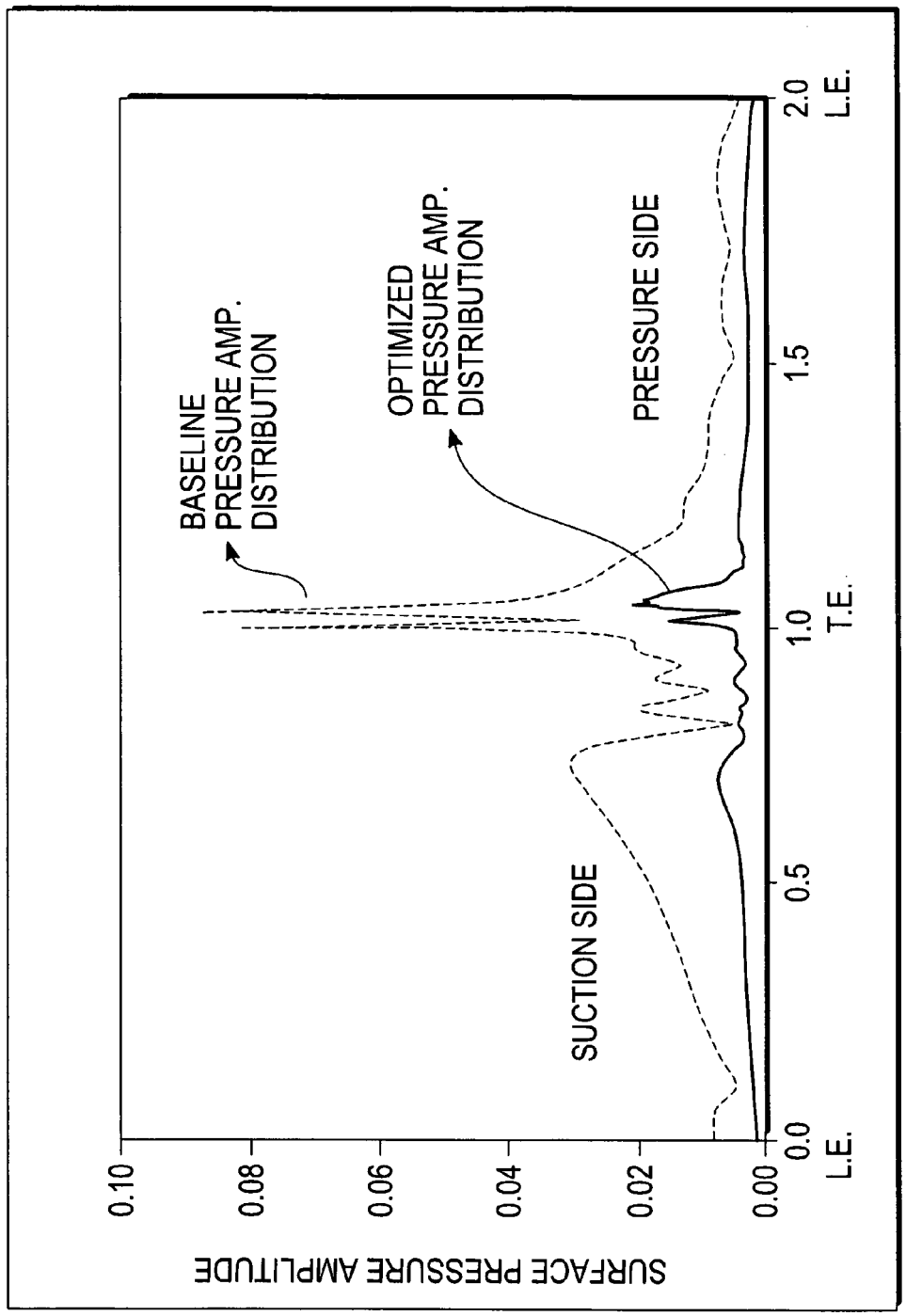
FIG. 12 graphically illustrates unsteady surface pressure loading (maximum pressure minus minimum pressure as the pressures fluctuate in time) for the initial and optimized airfoil shapes.

FIG. 12 graphically illustrates computed pressure amplitude value PA (maximum pressure minus corresponding minimum pressure as the pressures fluctuate in time) for the initial and optimized airfoil shapes. At the trailing end T-END of the blade, the optimal airfoil shape PA value is about 25 percent of the (much higher) PA value for the initial airfoil shape. Along the entire airfoil perimeter, the optimized airfoil shape provides a computed PA value that is, with a few exceptions, about 20-50 percent of the PA value for the initial airfoil shape.

Figure 13:
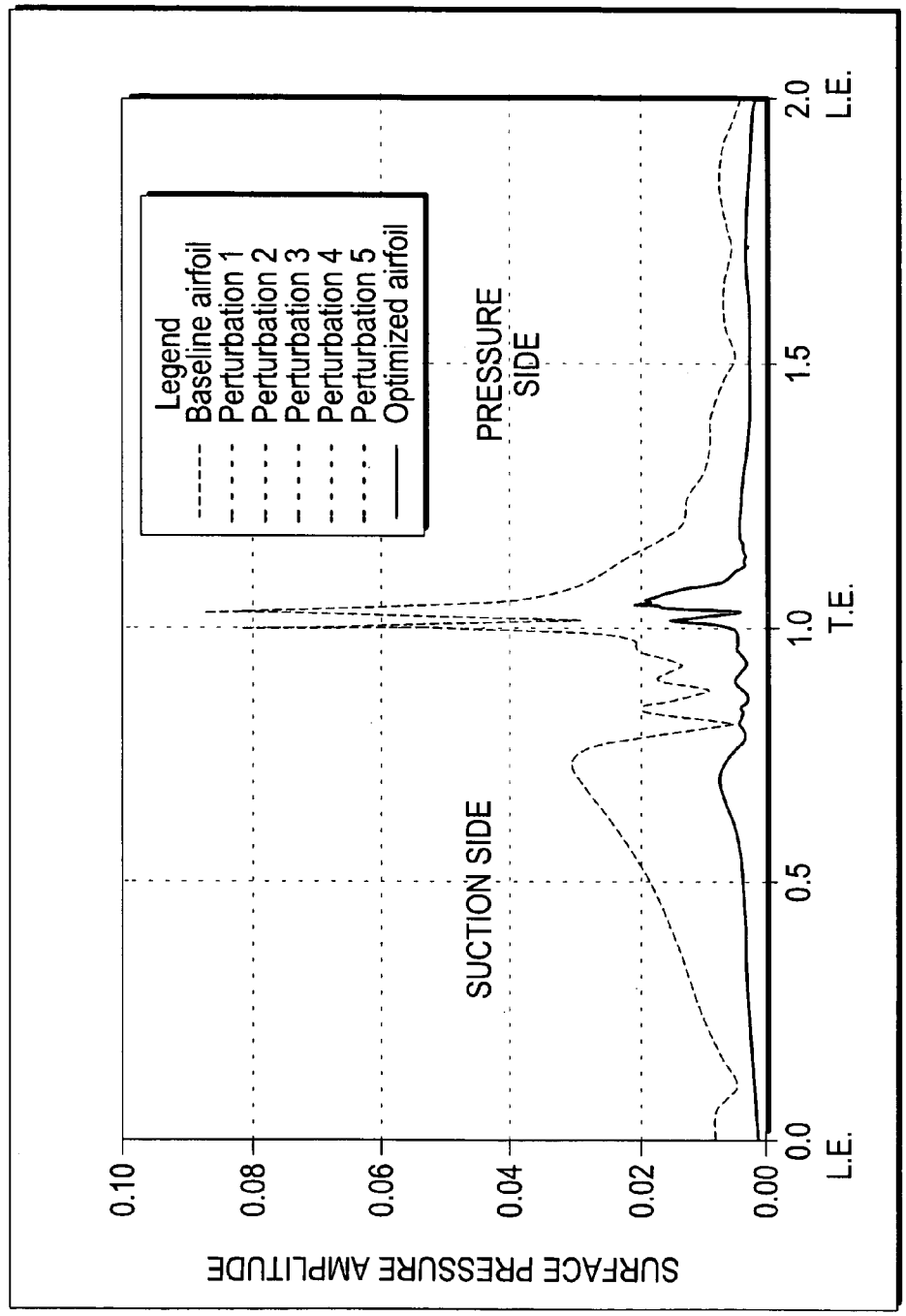
FIGS. 13 and 14 each graphically illustrate resulting unsteady pressure loading on an airfoil perimeter for the optimized airfoil shape for ten perturbations of the optimal shape.
Figure 14:
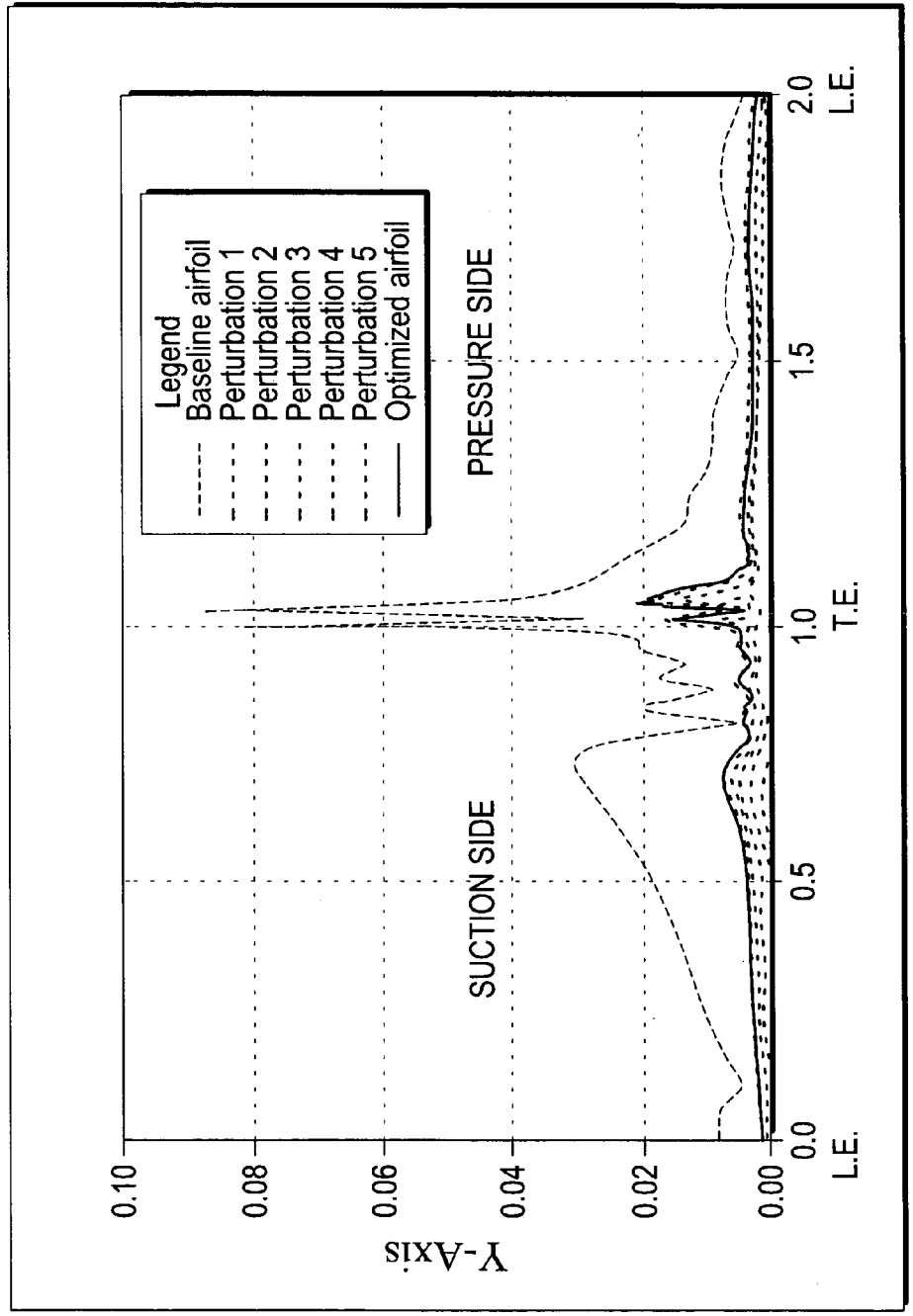

In manufacturing a blade according to the optimized airfoil shape, some perturbations in dimensions, relative to the ideal optimized dimensions, are inevitable. These perturbations and their effects have been modeled by (1) assigning a local thickness (at selected locations on the airfoil perimeter) in which the airfoil thickness, in a direction perpendicular to the local slope of the airfoil, varies by an amount f(r)h0, where h0=0.006 inch and f is a random variable uniformly distributed over a range $-1.0 \leq f \leq 1.0$ (varying from one perimeter location r to another); (2) computing the perturbations to the airfoil shape at locations intermediate between the selected locations, using a spline; and (3) recomputing the pressure loading value for the resulting changed airfoil shape. This modeling was performed for ten sets of independently chosen sets of random variables $\{f(r)\}_r$, and the resulting ten perturbed pressure amplitude distributions for the optimized airfoil shape are graphically illustrated in FIG. 13 (perturbations 1-5) and FIG. 14 (perturbations 6-10). For comparison purposes, the pressure amplitude values PA for the initial airfoil shape are included in each of FIGS. 13 and 14. FIGS. 13 and 14 demonstrate the robustness of the optimized airfoil shape to modest perturbations in airfoil thickness at each of a sequence of airfoil perimeter locations: the PA values for the perturbed optimized airfoil shapes for these ten perturbations are nearly the same and are again about 20-50 percent of the corresponding PA values for the initial airfoil shape.

Figure 15:
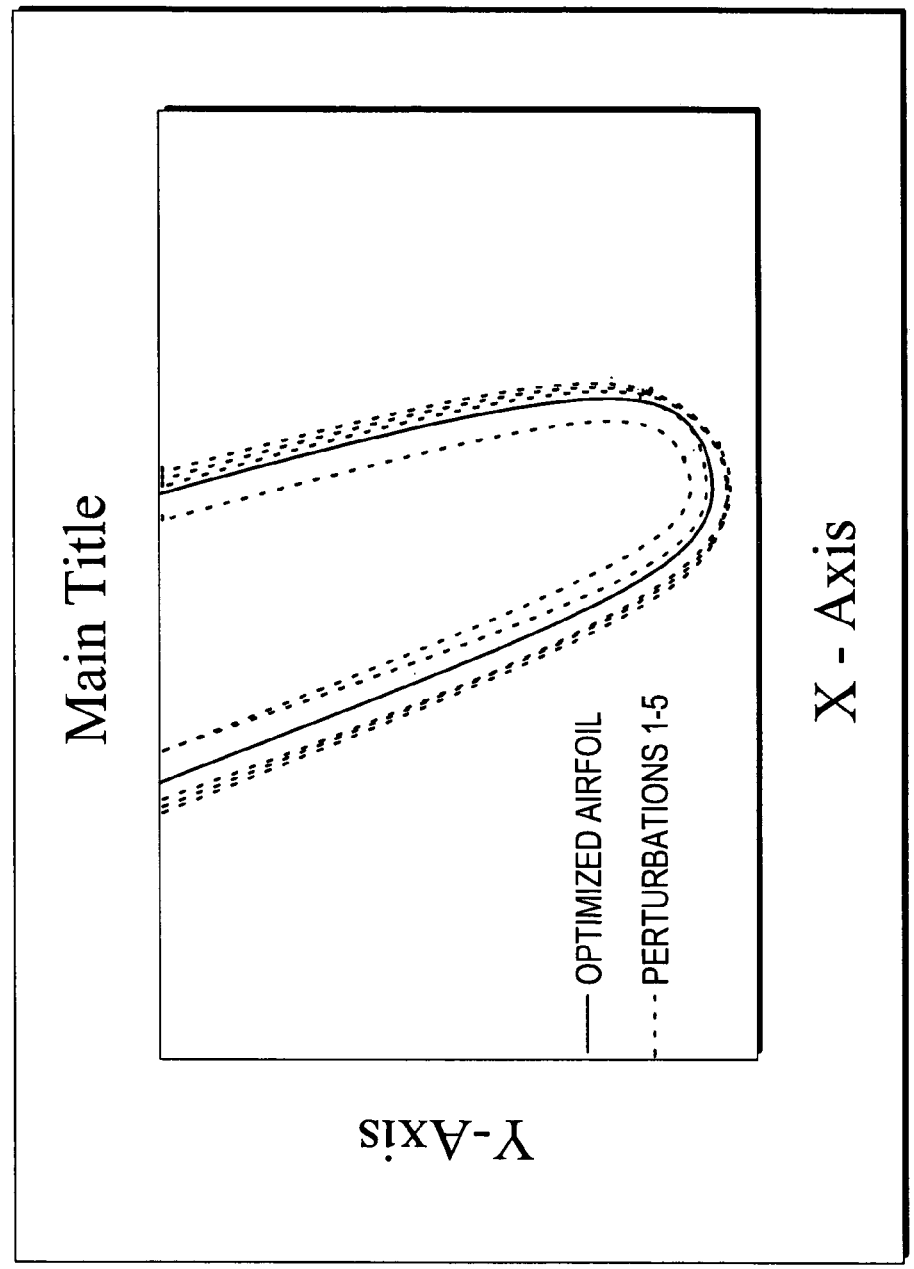
FIGS. 15 and 16 illustrate airfoil shape for each of the ten perturbations introduced in FIGS. 13 and 14.
Figure 16:
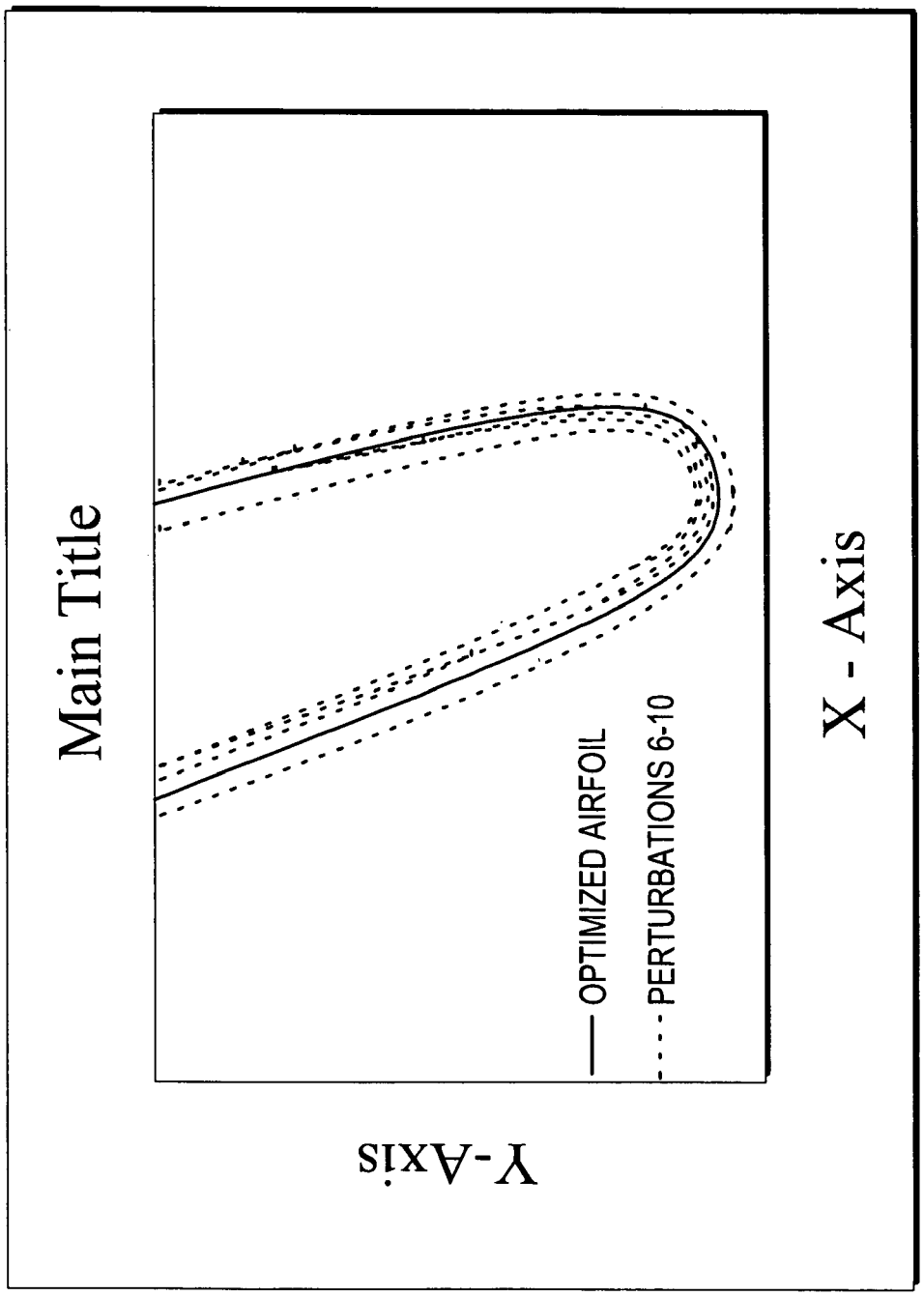

FIGS. 15 and 16 graphically illustrate the perturbed optimized airfoil shape in a neighborhood of the trailing end T-END for perturbations 1-5 and 6-10, respectively. The airfoil thickness appears to change by 10-30 percent near T-END for each of these ten perturbations.

For a particular design determined using the constraints set forth in the preceding, the following improvements have been confirmed by numerical computation and modeling of the resulting airfoil shape: (1) the optimized airfoil shape is thicker and stronger (mean operating stresses reduced by an estimated 37 percent); (2) vortex shedding amplitude is reduced substantially; (3) vortex shedding frequency is reduced, lowest airfoil resonant frequency is increased, and the frequency difference is increased to at least 27 percent of the vortex shedding frequency; (4) shedding characteristics are robust and change relatively little in response to random changes in airfoil dimensions that might be introduced by manufacturing processes; (5) unsteady pressure loading on the optimized shape airfoil is reduced by 50-80 percent, relative to the initial airfoil shape; (6) airfoil surface cracking is (predicted to be) eliminated with the optimized airfoil shape; (7) the optimized airfoil trailing edge shape has a larger minimum radius and is easier to manufacture; (8) blade fabrication time can be reduced by eliminating certain welding activities; (9) all constraints are satisfied; (10) no substantial change(s) in turbine performance; (11) airfoil mean life to failure is predicted to be increased by an unlimited amount, based on a standard assumption of 10 percent alternating stresses; and (12) shedding resonance response is eliminated. The present design is intended for low speed, incompressible flow, although several of the preceding features appear to extend to high speed flow as well.

Table I sets forth airfoil perimeter coordinates, in an xy-plane, for the optimized airfoil shape at a sequence of 301 locations, where the x-axis and y-axis are positioned as indicated in FIG. 9. Substantially the same optimal shape would result if fewer than all the 301 locations in Table I are specified (e.g., 1/m of the 301 points, where m=2, 3, 4, . . . ).

Figure 17:
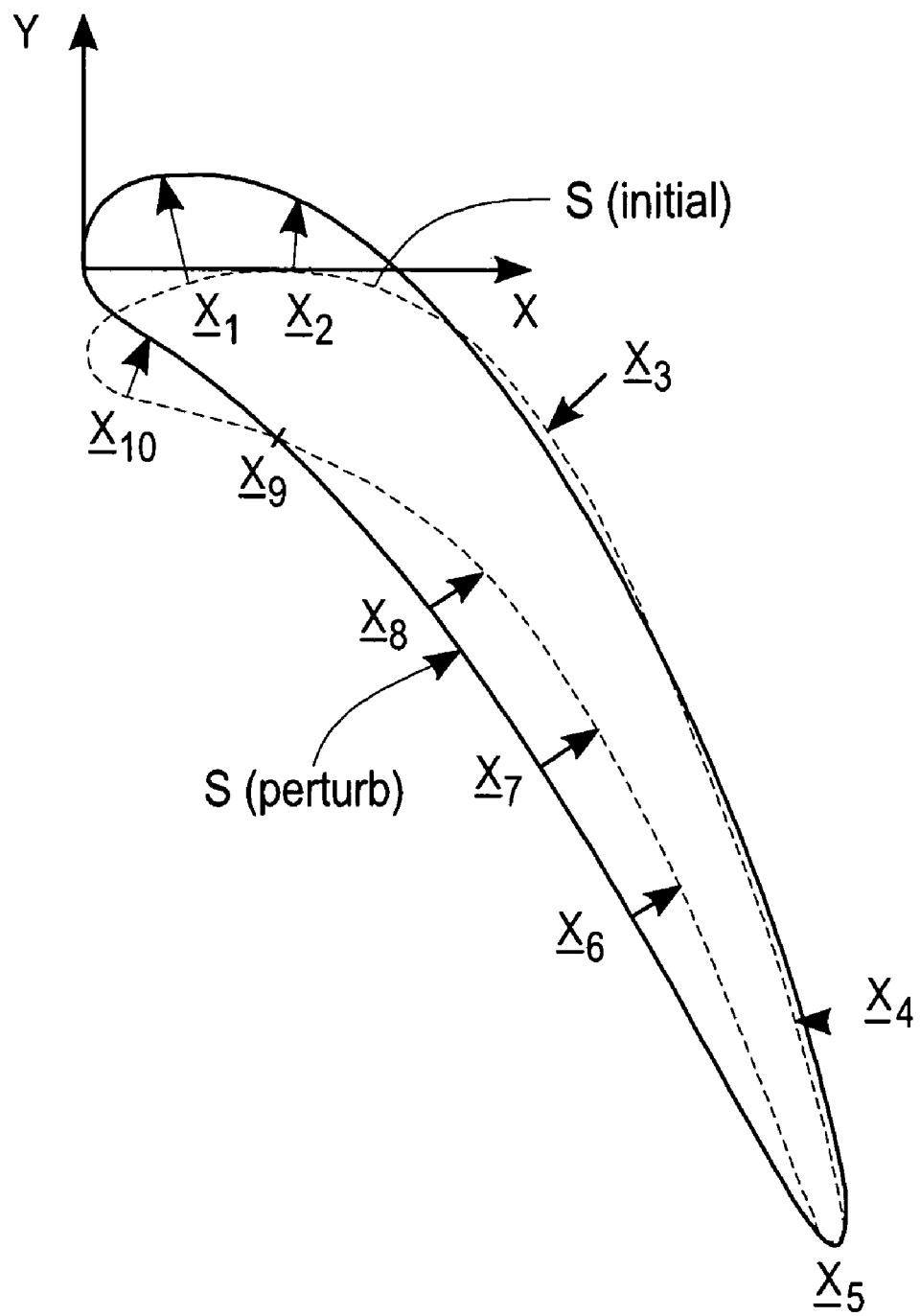
FIG. 17 illustrates a perturbation procedure that may be applied to vary the shape of an airfoil.

The perturbation procedure used to generate the perturbed shapes shown in FIGS. 9-16 may be applied more generally to generate a perturbed shape airfoil, as illustrated in FIG. 17. A sequence $\{x_n\}_n$ of N spaced apart locations on the perimeter of an airfoil is chosen, where N=10 in FIG. 17 for illustration, and a line segment $L(x_n)$, of a selected unit length is extended perpendicular to the airfoil at the location $x_n$. The unit length carries its own sign (±) and is preferably a selected small positive or negative number equal to $f_n \cdot L$, where $f_n$ is a selected fraction, for example, $-0.10 \leq f_n < 0.10$, or more preferably $-0.05 \leq f_n < 0.05$, and L is a chord length (or diameter) of the airfoil. The shape of the airfoil at the location $x_n$ is perturbed (extended or contracted) by the signed length $f_n \cdot L$ ($x_n$), and the perturbed shape between perimeter locations $x_{n-1}$, $x_n$ and $x_{n+1}$ (n=1, . . . , N−1) (with $x_0=x_N$) is determined by a cubic spline or other appropriate numerical procedure, to provide a perturbed shape S(perturb) based on the initial airfoil shape S(initial). The perturbed airfoil shape may be denoted $$S(\text{perturb})=\Phi\{S(\text{initial}); \{x_n f_n \cdot L\}_n; N\}, \quad (7)$$

where $\Phi$ is a functional that performs the procedure indicated in this paragraph, $\{x_n, f_n \cdot L\}_n$; is the sequence of selected locations $x_n$ and corresponding signed line segment lengths $f_n \cdot L$, and N is the number of perimeter locations used ($2 \leq N \leq 100$). One may, for example, begin with the optimal shape indicated in FIG. 9 and apply this perturbation procedure to produce a modified optimal shape; or one may apply this perturbation procedure as part of the NN/SVM processing. One may also rotate the optimal shape in the xy-plane and/or apply a scale factor of $\psi$ ($\psi>0$) to the optimal shape, as discussed in connection with FIG. 9.

APPENDIX

Examples of an NN analysis and of an SVM analysis are presented here. The invention is not limited to a particular NN analysis or to a particular SVM analysis.

Consider an object, represented by a group of coordinates $x=(x^1, x^2, \ldots, x^N)$, for which some physical feature or response of the object is to be optimized. The object may be a aircraft wing or turbine blade for which an ideal pressure distribution at specified locations on the object is to be achieved as closely as possible. The object may be a chemically reacting system with desired percentages of final compounds, for which total thermal energy output is minimized. The object may be represented at spaced apart locations or at spaced apart times by a group of independent coordinates, and an objective or cost function is presented, representing the response to be optimized. One or more constraints, either physical or numerical, are also set down, if desired.

In an NN analysis, one relevant problem is minimizing empirical risk over a sum of linear indicator or characteristic functions $$f(x, w) = \theta\left\{\sum_{i=1}^{N} w_i \cdot x^i\right\}, \quad (A\text{-}1)$$

where $\theta$ is an indicator or characteristic function, x is a coordinate vector and w is a vector of selected weight coefficients. Consider a training set of (N+1)-tuples $(x_1,y_1), (x_2,y_2), \ldots, (x_K,y_K)$, where each $x_j=(x_j^1, \ldots, x_j^N)$ is an N-tuple representing a vector and $y_j$ is a scalar having only the values −1 or +1.

The indicator function $\theta(z)$ has only two values, 0 and 1, and is not generally differentiable with respect to a variable in its argument. The indicator function $\theta(z)$ in Eq. (A-1) is often replaced by a general sigmoid function S(z) that is differentiable with respect to z everywhere on the finite real line, is monotonically increasing with z, and satisfies $$Lim_{z \to -\infty} S(z)=0, \quad (A\text{-}2a)$$

$$Lim_{z \to +\infty} S(z)=1. \quad (A\text{-}2b)$$

Examples of suitable sigmoid functions include the following $$S(z)=1/\{1+\exp(-\alpha z)\},$$

$$S(z)=\{1+\tan h(\beta \cdot z+\chi)\}/2$$

$$S(z)=\{\pi+2\cdot\tan^{-1}(\delta \cdot z+\epsilon)\}/2\pi,$$

where $\alpha$, $\beta$ and $\delta$ are selected positive values. The indicator sum f(x,w) in Eq. (A-1) is replaced by a modified sigmoid sum $$G(x, w) = S\left\{\sum_{i=1}^{N} w_i \cdot x^i\right\}. \quad (A\text{-}3)$$

where S is a selected linear or nonlinear function.

In order to minimize the empirical risk, one must determine the parameter values $w_i$ that minimize an empirical risk functional $$R_{emp}(w) = \sum_{j=1}^{K} (y_j - F(x_j, w))^2/K, \quad (A\text{-}4)$$

which is differentiable in the vector components w. One may, for example, use a gradient search approach to minimize $R_{emp}(w)$. The search may converge to a local minimum, which may or may not be a global minimum for the empirical risk.

Assume, first, that the training data $\{(x_j, y_j)\}$ can be separated by an optimal separating hyperplane, defined by $$(w \cdot x_j) - g = 0, \tag{A-5}$$

where g partly defines the hyperplane. A separating hyperplane satisfies $$(w \cdot x_j) - g \geq 1 (y_j \geq 1), \tag{A-6a}$$

$$(w \cdot x_j) - g \leq -1 (y_j \leq -1). \tag{A-6b}$$

An optimal separating hyperplane maximizes the functional $$\Phi(w) = (w \cdot w)/2, \tag{A-7}$$

with respect to the vector values w and the value g, subject to the constraints in Eqs. (A-6a)-(A-6b). Unless indicated otherwise, all sums in the following are understood to be over the index j (=1, ..., K).

A solution to this optimization problem is given by a saddle point of a Lagrange functional $$L(w, g, \alpha) = (w \cdot w)/2 - \sum_{j=1}^{K} \alpha_j \{((x_j \cdot w) - g) \cdot (y_j - 1)\}. \tag{A-8}$$

At a saddle point, the solutions $(w, g, \alpha)$ satisfy the relations $$\partial L/\partial g = 0, \tag{A-9}$$

$$\partial L/\partial w = 0, \tag{A-10}$$

with the associated constraint $$\alpha_j \geq 0, \tag{A-11}$$

Equation (A-9) yields the constraint $$\sum_{j=1}^{K} \alpha_j \cdot y_j = 0. \tag{A-12}$$

Equation (A-10) provides an expression for the parameter vector w of an optimal hyperplane as a linear combination of vectors in the training set $$w = \Sigma y_j \cdot \alpha_j \cdot x_j, \tag{A-13}$$

An optimal solution $(w, g, \alpha)$ must satisfy a Kuhn-Tucker condition $$\alpha_j \{((x_j \cdot w) - g) \cdot (y_j - 1) = 0 (=1, \ldots, K). \tag{A-14}$$

Only some of the training vectors, referred to herein as "support vectors," have non-zero coefficients in the expansion of the optimal solution vector w. More precisely, the expansion in Eq. (A-13) can be rewritten as $$w = \Sigma y_j \cdot \alpha_j \cdot x_j. \tag{A-15}$$

support vectors

Substituting the optimal vector w back into Eq. (A-8) and taking into account the Kuhn-Tucker condition, the Lagrange functional to be minimized is re-expressed as $$L(\alpha) = \sum_{j=1}^{K} \alpha_j - (1/2) \sum_{i,j=1}^{K} \alpha_i \cdot \alpha_j \cdot y_i \cdot y_j \cdot (x_i \cdot x_j). \tag{A-16}$$

This functional is to be maximized, subject to the constraints expressed in Eqs. (A-13) and (A-14). Substituting the expression for optimal parameter vector w into Eq. (A-14), one obtains $$(w \cdot x) - g = \Sigma \alpha_j \cdot (x_j \cdot x) - g = 0. \tag{A-17}$$

The preceding development assumes that the training set data $\{(x_j, y_j)\}$ are separable by a hyperplane. If these data are not separable by a hyperplane, one introduces non-negative slack variables $\chi_j$ (j=1, ..., K) and a modified functional $$\Phi(w) = (w \cdot w) + C \cdot \chi_j, \tag{A-18}$$

subject to the constraints $$y_j \cdot ((w \cdot x_j) - g) \geq 1 - \chi_j \tag{A-19}$$

where the (positive) coefficient C corresponds to an interpenetration of two or more groups of training set (N+1)-tuples into each other (thus, precluding separation by a hyperplane). Repeating the preceding analysis, where the functional $\Phi(w)$ replaces the term $(w \cdot w)$, an optimal solution $(w, g, \alpha)$ is found as before by maximizing a quadratic form, subject to the modified constraints $$\Sigma \alpha_j \cdot y_j = 0., \tag{A-20a}$$

$$0 \leq \alpha_j \leq C. \tag{A-20b}$$

Use of (only) hyperplanes in an input space is insufficient for certain classes of data. See the examples in FIGS. 11A and 11B.

In a support vector machine, input vectors are mapped into a high dimension feature space Z through a selected nonlinear mapping. In the space Z, an optimal separating hyperplane is constructed that maximizes a certain $\Delta$-margin associated with hyperplane separation.

First, consider a mapping that allows one to construct decision polynomials of degree 2 in the input space. One creates a (quadratic) feature space Z having dimension M=N(N+3)/2, with coordinates $$u_j = x^j (j=1, \ldots, N: N \text{ coordinates}) \tag{A-21a}$$

$$u_{j+N} = x_j^2 (j=1, \ldots, N; N \text{ coordinates}) \tag{A-21b}$$

$$u_{j+2N} = x_1 \cdot x_2, x_1 \cdot x_3, x_{N-1} \cdot x_N, (N(N-1)/2 \text{ coordinates}). \tag{A-21c}$$

A separating hyperplane constructed in the space Z is assumed to be a second degree polynomial in the input space coordinates $x_j$ (j=1, ..., N).

By analogy, in order to construct a polynomial of degree k in the input coordinates, one must construct a space Z having of the order of $N^k$ coordinates, where one constructs an optimal separating hyperplane. For example, for k=4, the maximum number of coordinates needed in the space Z is $$\max(k=4) = (N+k)!/\{N!k!\}_{k=4} \tag{A-22}$$

which is about $10^8$ coordinates for a modest size input space of N=100 independent coordinates.

For a quadratic feature space Z, one first determines a kernel function K of inner-products according to $$(u_{L1} \cdot u_{L2}) = K(x_{j1}, x_{j2}) = K(x_{j2}, x_{j1}) \quad (L1, L2 = 1 \ldots, N(N+1)/2). \quad \text{(A-23)}$$

One constructs nonlinear decision functions $$I(x) = sgn\{\Sigma \alpha_j \cdot K(x, x_j) + b0\} \quad \text{(A-24)}$$

support vectors that are equivalent to the decision function $\Phi(x)$ in Eq. (A-18). By analogy with the preceding, the coefficients $\alpha_j$ are estimated by solving the equation $$W(\alpha) = \Sigma \alpha_j - (\tfrac{1}{2}) \Sigma \alpha_i \alpha_j x_i \cdot x_j \cdot K(x_i, x_j), \quad \text{(A-25)}$$

with the following constraint (or sequence of constraints) imposed:

$$\Sigma \alpha_j \cdot y_j = 0, \quad \text{(A-26a)}$$

$$\alpha_j \geq 0. \quad \text{(A-26b)}$$

Mercer (1909) has proved that a one-to-one correspondence exists between the set of symmetric, positive definite functions $\kappa(x,y)$ defined on the real line that satisfy $$\int\int \kappa(x,y) f(x) f(y) \, dx \, dy \geq 0 \quad \text{(A-27)}$$

for any L2-integrable function f(x) satisfying $$\int f(x)^2 \, dx < \infty \quad \text{(A-28)}$$

and the set of inner products defined on that function space {f}. Thus, any kernel function $K(x_{j1}, x_{j2})$ satisfying conditions of the Mercer theorem can be used to construct an inner product of the type set forth in Eq. (A-23). Using different expressions for the kernel $K(x_{j1}, x_{j2})$, one can construct different learning machines with corresponding nonlinear decision functions.

For example, the kernel function $$K(x', x'') = \{(x' \cdot x'') + 1\}^q, \quad \text{(A-29)}$$

can be used to specify polynomials of degree up to q (preferably an integer).

Much of the preceding development is taken from V.N. Vapnik, "An Overview of Statistical Learning Theory", IEEE Trans. Neural Networks, vol. 10 (1999), pp. 988-999. The present invention provides a hybrid approach in which the input layer and hidden layer(s) of an NN component are used to create a data-adaptive feature space for an SVM component. As indicated in the preceding, the combined NN/SVM analysis of the invention is not limited to the particular NN analysis or to the particular SVM analysis set forth in this Appendix.

TABLE 1

AIRFOIL SHAPE DATA (301 PERIMETER POINTS)

| Pt. No. | x-value | y-value |
|---|---|---|
| 1) | 0.00000 | 0.00000 |
| 2) | 0.00028 | 0.00479 |
| 3) | 0.00119 | 0.00986 |
| 4) | 0.00283 | 0.01514 |
| 5) | 0.00532 | 0.02056 |
| 6) | 0.00872 | 0.02601 |
| 7) | 0.01310 | 0.03138 |
| 8) | 0.01848 | 0.03650 |
| 9) | 0.02481 | 0.04124 |
| 10) | 0.03203 | 0.04545 |
| 11) | 0.04001 | 0.04900 |

TABLE 1-continued

AIRFOIL SHAPE DATA (301 PERIMETER POINTS)

| Pt. No. | x-value | y-value |
|---|---|---|
| 12) | 0.04861 | 0.05178 |
| 13) | 0.05764 | 0.05373 |
| 14) | 0.06694 | 0.05479 |
| 15) | 0.07628 | 0.05505 |
| 16) | 0.08540 | 0.05462 |
| 17) | 0.09428 | 0.05355 |
| 18) | 0.10295 | 0.05187 |
| 19) | 0.11140 | 0.04964 |
| 20) | 0.11964 | 0.04690 |
| 21) | 0.12767 | 0.04368 |
| 22) | 0.13551 | 0.04002 |
| 23) | 0.14315 | 0.03595 |
| 24) | 0.15061 | 0.03150 |
| 25) | 0.15788 | 0.02671 |
| 26) | 0.16497 | 0.02160 |
| 27) | 0.17188 | 0.01621 |
| 28) | 0.17862 | 0.01055 |
| 29) | 0.18520 | 0.00465 |
| 30) | 0.19161 | −0.00146 |
| 31) | 0.19786 | −0.00777 |
| 32) | 0.20396 | −0.01425 |
| 33) | 0.20991 | −0.02088 |
| 34) | 0.21571 | −0.02763 |
| 35) | 0.22136 | −0.03449 |
| 36) | 0.22688 | −0.04144 |
| 37) | 0.23226 | −0.04845 |
| 38) | 0.23751 | −0.05551 |
| 39) | 0.24262 | −0.06261 |
| 40) | 0.24761 | −0.06973 |
| 41) | 0.25248 | −0.07685 |
| 42) | 0.25722 | −0.08397 |
| 43) | 0.26185 | −0.09108 |
| 44) | 0.26636 | −0.09816 |
| 45) | 0.27076 | −0.10520 |
| 46) | 0.27506 | −0.11221 |
| 47) | 0.27924 | −0.11916 |
| 48) | 0.28332 | −0.12606 |
| 49) | 0.28730 | −0.13290 |
| 50) | 0.29119 | −0.13968 |
| 51) | 0.29497 | −0.14638 |
| 52) | 0.29866 | −0.15301 |
| 53) | 0.30226 | −0.15955 |
| 54) | 0.30578 | −0.16602 |
| 55) | 0.30920 | −0.17240 |
| 56) | 0.31254 | −0.17869 |
| 57) | 0.31580 | −0.18490 |
| 58) | 0.31897 | −0.19101 |
| 59) | 0.32207 | −0.19703 |
| 60) | 0.32509 | −0.20296 |
| 61) | 0.32804 | −0.20881 |
| 62) | 0.33091 | −0.21459 |
| 63) | 0.33371 | −0.22030 |
| 64) | 0.33644 | −0.22594 |
| 65) | 0.33911 | −0.23152 |
| 66) | 0.34171 | −0.23704 |
| 67) | 0.34424 | −0.24251 |
| 68) | 0.34671 | −0.24792 |
| 69) | 0.34912 | −0.25329 |
| 70) | 0.35147 | −0.25860 |
| 71) | 0.35377 | −0.26386 |
| 72) | 0.35600 | −0.26907 |
| 73) | 0.35818 | −0.27424 |
| 74) | 0.36031 | −0.27935 |
| 75) | 0.36238 | −0.28442 |
| 76) | 0.36440 | −0.28944 |
| 77) | 0.36637 | −0.29441 |
| 78) | 0.36830 | −0.29934 |
| 79) | 0.37017 | −0.30421 |
| 80) | 0.37200 | −0.30903 |
| 81) | 0.37378 | −0.31381 |
| 82) | 0.37552 | −0.31853 |
| 83) | 0.37722 | −0.32321 |
| 84) | 0.37887 | −0.32783 |
| 85) | 0.38049 | −0.33240 |
| 86) | 0.38206 | −0.33691 |

TABLE 1-continued

AIRFOIL SHAPE DATA (301 PERIMETER POINTS)

| Pt. No. | x-value | y-value |
|---|---|---|
| 87) | 0.38359 | −0.34137 |
| 88) | 0.38509 | −0.34578 |
| 89) | 0.38655 | −0.35014 |
| 90) | 0.38797 | −0.35444 |
| 91) | 0.38936 | −0.35868 |
| 92) | 0.39075 | −0.36298 |
| 93) | 0.39212 | −0.36726 |
| 94) | 0.39346 | −0.37153 |
| 95) | 0.39479 | −0.37579 |
| 96) | 0.39610 | −0.38003 |
| 97) | 0.39738 | −0.38426 |
| 98) | 0.39865 | −0.38847 |
| 99) | 0.39990 | −0.39267 |
| 100) | 0.40113 | −0.39685 |
| 101) | 0.40234 | −0.40100 |
| 102) | 0.40354 | −0.40514 |
| 103) | 0.40472 | −0.40926 |
| 104) | 0.40588 | −0.41335 |
| 105) | 0.40702 | −0.41742 |
| 106) | 0.40814 | −0.42146 |
| 107) | 0.40925 | −0.42547 |
| 108) | 0.41034 | −0.42946 |
| 109) | 0.41142 | −0.43341 |
| 110) | 0.41248 | −0.43733 |
| 111) | 0.41352 | −0.44121 |
| 112) | 0.41455 | −0.44507 |
| 113) | 0.41556 | −0.44888 |
| 114) | 0.41656 | −0.45267 |
| 115) | 0.41754 | −0.45641 |
| 116) | 0.41851 | −0.46013 |
| 117) | 0.41947 | −0.46380 |
| 118) | 0.42041 | −0.46744 |
| 119) | 0.42133 | −0.47104 |
| 120) | 0.42224 | −0.47460 |
| 121) | 0.42314 | −0.47812 |
| 122) | 0.42403 | −0.48161 |
| 123) | 0.42490 | −0.48505 |
| 124) | 0.42576 | −0.48846 |
| 125) | 0.42660 | −0.49182 |
| 126) | 0.42744 | −0.49515 |
| 127) | 0.42826 | −0.49844 |
| 128) | 0.42907 | −0.50169 |
| 129) | 0.42986 | −0.50490 |
| 130) | 0.43065 | −0.50808 |
| 131) | 0.43142 | −0.51121 |
| 132) | 0.43218 | −0.51430 |
| 133) | 0.43294 | −0.51736 |
| 134) | 0.43367 | −0.52037 |
| 135) | 0.43440 | −0.52335 |
| 136) | 0.43512 | −0.52629 |
| 137) | 0.43583 | −0.52919 |
| 138) | 0.43652 | −0.53205 |
| 139) | 0.43721 | −0.53488 |
| 140) | 0.43789 | −0.53767 |
| 141) | 0.43855 | −0.54042 |
| 142) | 0.43921 | −0.54313 |
| 143) | 0.43985 | −0.54581 |
| 144) | 0.44049 | −0.54845 |
| 145) | 0.44112 | −0.55105 |
| 146) | 0.44173 | −0.55362 |
| 147) | 0.44234 | −0.55616 |
| 148) | 0.44294 | −0.55865 |
| 149) | 0.44353 | −0.56112 |
| 150) | 0.44411 | −0.56355 |
| 151) | 0.44469 | −0.56594 |
| 152) | 0.44525 | −0.56830 |
| 153) | 0.44581 | −0.57063 |
| 154) | 0.44636 | −0.57293 |
| 155) | 0.44690 | −0.57519 |
| 156) | 0.44743 | −0.57742 |
| 157) | 0.44795 | −0.57962 |
| 158) | 0.44847 | −0.58178 |
| 159) | 0.44898 | −0.58392 |
| 160) | 0.44948 | −0.58602 |
| 161) | 0.44997 | −0.58810 |
| 162) | 0.45045 | −0.59014 |
| 163) | 0.45093 | −0.59216 |
| 164) | 0.45141 | −0.59414 |
| 165) | 0.45187 | −0.59610 |
| 166) | 0.45233 | −0.59802 |
| 167) | 0.45278 | −0.59992 |
| 168) | 0.45320 | −0.60183 |
| 169) | 0.45358 | −0.60374 |
| 170) | 0.45391 | −0.60566 |
| 171) | 0.45419 | −0.60760 |
| 172) | 0.45440 | −0.60954 |
| 173) | 0.45453 | −0.61148 |
| 174) | 0.45456 | −0.61343 |
| 175) | 0.45449 | −0.61538 |
| 176) | 0.45429 | −0.61733 |
| 177) | 0.45392 | −0.61924 |
| 178) | 0.45334 | −0.62110 |
| 179) | 0.45252 | −0.62287 |
| 180) | 0.45143 | −0.62448 |
| 181) | 0.45001 | −0.62582 |
| 182) | 0.44836 | −0.62685 |
| 183) | 0.44656 | −0.62760 |
| 184) | 0.44471 | −0.62819 |
| 185) | 0.44279 | −0.62852 |
| 186) | 0.44084 | −0.62849 |
| 187) | 0.43895 | −0.62800 |
| 188) | 0.43717 | −0.62722 |
| 189) | 0.43552 | −0.62618 |
| 190) | 0.43400 | −0.62497 |
| 191) | 0.43259 | −0.62361 |
| 192) | 0.43129 | −0.62216 |
| 193) | 0.43007 | −0.62064 |
| 194) | 0.42892 | −0.61906 |
| 195) | 0.42785 | −0.61743 |
| 196) | 0.42684 | −0.61576 |
| 197) | 0.42587 | −0.61406 |
| 198) | 0.42496 | −0.61234 |
| 199) | 0.42408 | −0.61060 |
| 200) | 0.42325 | −0.60883 |
| 201) | 0.42245 | −0.60705 |
| 202) | 0.42168 | −0.60526 |
| 203) | 0.42094 | −0.60345 |
| 204) | 0.42021 | −0.60164 |
| 205) | 0.41944 | −0.59972 |
| 206) | 0.41861 | −0.59767 |
| 207) | 0.41773 | −0.59550 |
| 208) | 0.41678 | −0.59318 |
| 209) | 0.41578 | −0.59073 |
| 210) | 0.41471 | −0.58812 |
| 211) | 0.41356 | −0.58534 |
| 212) | 0.41234 | −0.58240 |
| 213) | 0.41103 | −0.57928 |
| 214) | 0.40964 | −0.57596 |
| 215) | 0.40815 | −0.57244 |
| 216) | 0.40656 | −0.56872 |
| 217) | 0.40486 | −0.56477 |
| 218) | 0.40305 | −0.56058 |
| 219) | 0.40112 | −0.55615 |
| 220) | 0.39905 | −0.55146 |
| 221) | 0.39685 | −0.54650 |
| 222) | 0.39450 | −0.54125 |
| 223) | 0.39199 | −0.53571 |
| 224) | 0.38931 | −0.52985 |
| 225) | 0.38645 | −0.52367 |
| 226) | 0.38339 | −0.51714 |
| 227) | 0.38013 | −0.51026 |
| 228) | 0.37665 | −0.50299 |
| 229) | 0.37293 | −0.49534 |
| 230) | 0.36897 | −0.48727 |
| 231) | 0.36473 | −0.47877 |
| 232) | 0.36021 | −0.46982 |
| 233) | 0.35538 | −0.46038 |
| 234) | 0.35023 | −0.45044 |
| 235) | 0.34473 | −0.43996 |
| 236) | 0.33886 | −0.42893 |

TABLE 1-continued

AIRFOIL SHAPE DATA (301 PERIMETER POINTS)

| Pt. No. | x-value | y-value |
|---|---|---|
| 237) | 0.33259 | −0.41731 |
| 238) | 0.32590 | −0.40510 |
| 239) | 0.31875 | −0.39229 |
| 240) | 0.31113 | −0.37885 |
| 241) | 0.30299 | −0.36478 |
| 242) | 0.29430 | −0.35006 |
| 243) | 0.28502 | −0.33470 |
| 244) | 0.27511 | −0.31870 |
| 245) | 0.26454 | −0.30206 |
| 246) | 0.25397 | −0.28587 |
| 247) | 0.24375 | −0.27064 |
| 248) | 0.23387 | −0.25630 |
| 249) | 0.22432 | −0.24281 |
| 250) | 0.21509 | −0.23010 |
| 251) | 0.20617 | −0.21811 |
| 252) | 0.19755 | −0.20681 |
| 253) | 0.18921 | −0.19615 |
| 254) | 0.18116 | −0.18609 |
| 255) | 0.17337 | −0.17659 |
| 256) | 0.16584 | −0.16761 |
| 257) | 0.15856 | −0.15913 |
| 258) | 0.15153 | −0.15112 |
| 259) | 0.14473 | −0.14355 |
| 260) | 0.13816 | −0.13638 |
| 261) | 0.13181 | −0.12961 |
| 262) | 0.12567 | −0.12319 |
| 263) | 0.11974 | −0.11712 |
| 264) | 0.11400 | −0.11137 |
| 265) | 0.10846 | −0.10593 |
| 266) | 0.10310 | −0.10077 |
| 267) | 0.09792 | −0.09588 |
| 268) | 0.09292 | −0.09124 |
| 269) | 0.08808 | −0.08684 |
| 270) | 0.08340 | −0.08267 |
| 271) | 0.07888 | −0.07871 |
| 272) | 0.07451 | −0.07495 |
| 273) | 0.07028 | −0.07138 |
| 274) | 0.06620 | −0.06799 |
| 275) | 0.06225 | −0.06477 |
| 276) | 0.05844 | −0.06171 |
| 277) | 0.05475 | −0.05879 |
| 278) | 0.05119 | −0.05602 |
| 279) | 0.04774 | −0.05339 |
| 280) | 0.04441 | −0.05088 |
| 281) | 0.04119 | −0.04849 |
| 282) | 0.03808 | −0.04622 |
| 283) | 0.03507 | −0.04405 |
| 284) | 0.03217 | −0.04199 |
| 285) | 0.02936 | −0.04002 |
| 286) | 0.02664 | −0.03814 |
| 287) | 0.02402 | −0.03635 |
| 288) | 0.02148 | −0.03465 |
| 289) | 0.01898 | −0.03289 |
| 290) | 0.01661 | −0.03106 |
| 291) | 0.01437 | −0.02913 |
| 292) | 0.01225 | −0.02711 |
| 293) | 0.01024 | −0.02498 |
| 294) | 0.00835 | −0.02271 |
| 295) | 0.00657 | −0.02027 |
| 296) | 0.00492 | −0.01764 |
| 297) | 0.00341 | −0.01477 |
| 298) | 0.00209 | −0.01161 |
| 299) | 0.00102 | −0.00813 |
| 300) | 0.00028 | −0.00427 |
| 301) | 0.00000 | 0.00000 |

What is claimed is:

1. A method for design of a rotating machinery airfoil, the method comprising:

providing an initial airfoil shape;

providing a statement of at least one objective that a final airfoil shape must satisfy;

providing a statement of at least one constraint that the final airfoil shape must satisfy;

using computational fluid dynamics ("CFD") to estimate a pressure value at each of at least two selected perimeter locations for the initial airfoil shape;

using a neural network/support vector machine ("NN/SVM") and CFD to determine a modified airfoil shape and a corresponding pressure value change, from a pressure value determined for the initial airfoil shape, at the two or more airfoil perimeter locations, in response to change of a portion of the airfoil shape in a neighborhood of the corresponding perimeter location; and providing at least one of an alphanumeric description and a graphical description of at least one version of the modified airfoil shape as the final airfoil shape.

2. The method of claim 1, further comprising choosing said at least one objective from a group of objectives comprising: maximizing thickness of said airfoil by maximizing a trailing edge wedge angle for said airfoil; minimizing a peak of pressure loss associated with said airfoil; minimizing a magnitude of pressure undulations on a surface of said airfoil; and minimizing an amplitude of vortex shedding from said airfoil.

3. The method of claim 1, further comprising choosing said at least one constraint from a group of constraints comprising: vortex shedding from a trailing edge of said airfoil is no greater than a selected threshold value; a difference between any resonant frequency of said airfoil and a vortex shedding frequency is at least equal to a threshold frequency difference; mass of said airfoil is no larger than a threshold mass value; pressure value at each of a sequence of selected locations along a perimeter of said airfoil differs from a corresponding reference pressure value by no more than a threshold pressure difference value; airfoil chord length lies in a selected range; mass flow rate through a row of said airfoils is substantially unchanged; and gas exit angle from a row of said airfoils is substantially unchanged.

4. The method of claim 1, further comprising using said computational fluid dynamics to estimate a pressure value at each of at least two selected perimeter locations for said initial airfoil shape for air flow in at least one subsonic flow regime.

5. The method of claim 1, further comprising determining said modified airfoil shape by a process further comprising:

providing a sequence of N selected spaced apart vector locations $x_n$ on a perimeter of said airfoil and a line segment, having a length $L \cdot f_n$ and being substantially perpendicular to a curve representing the airfoil perimeter in a neighborhood of each of the locations $x_n$, where L is a chord length of said airfoil and $f_n$ is a fraction lying in a range that is substantially defined by $-0.10 \leq f_n \leq 0.10$, where line segment number n has a first end at the location $x_n$ and has a second end located at a distance $L \cdot f_n$ from the line segment first end (n=1, ..., N); and defining said modified airfoil shape, in part, by a sequence of second ends of the line segments number n=1, ..., N, and defining said modified airfoil shape, in part, by a selected continuous curve connecting the line segments numbers n'−1, n' and n'+1, for n'=1, ..., N−1.

6. The method of claim 1, further comprising determining said modified airfoil shape by a process further comprising:

providing a sequence of N selected spaced apart vector locations $x_n = (x_n, y_n)$ on a perimeter of said airfoil and a line segment, extending a segment first end at the vector $x_n$ to a segment second end at a vector $x'_n = (x'_n, y'_n)$, where $x'_n = a \cdot x_n + b$, $y'_n = c \cdot y_n + d$, where a, b, c and d are selected real numbers, and a and b are positive; and defining said modified airfoil shape, in part, by a sequence of the line segment second ends number n=1, ..., N, and defining said modified airfoil shape, in part, by a selected continuous curve connecting the line segments numbers n'−1, n' and n'+1, for n'=1, ..., N−1.

7. A system for design of a rotating machinery airfoil, the system comprising a computer that is programmed:

to provide an initial airfoil shape;

to provide a statement of at least one objective that a final airfoil shape must satisfy;

to provide a statement of at least one constraint that the final airfoil shape must satisfy;

to use computational fluid dynamics ("CFD") to estimate a pressure value at each of at least two selected perimeter locations for the initial airfoil shape;

to use a neural network/support vector machine ("NN/SVM") and CFD to determine a modified airfoil shape and a corresponding pressure value change, from a pressure value determined for the initial airfoil shape, at the two or more airfoil perimeter locations, in response to change of a portion of the airfoil shape in a neighborhood of the corresponding perimeter location; and to provide at least one of an alphanumeric description and a graphical description of at least one version of the modified airfoil shape as the final airfoil shape.

8. The system of claim 7, wherein said computer is further programmed to provide said at least one objective from a group of objectives comprising: maximizing thickness of said airfoil by maximizing a trailing edge wedge angle for said airfoil; minimizing a peak of pressure loss associated with said airfoil; minimizing a magnitude of pressure undulations on a surface of said airfoil; and minimizing an amplitude of vortex shedding from said airfoil.

9. The system of claim 7, wherein said computer is further programmed to choose said at least one constraint from a group of constraints comprising: vortex shedding from a trailing edge of said airfoil is no greater than a selected threshold value; a difference between any resonant frequency of said airfoil and a vortex shedding frequency is at least equal to a threshold frequency difference; mass of said airfoil is no larger than a threshold mass value; pressure value at each of a sequence of selected locations along a perimeter of said airfoil differs from a corresponding reference pressure value by no more than a threshold pressure difference value; airfoil chord length lies in a selected range; mass flow rate through a row of said airfoils is unchanged; and gas exit angle from a row of said airfoils is unchanged.

10. The system of claim 7, wherein said computer is further programmed to use said computational fluid dynamics to estimate a pressure value at each of at least two selected perimeter locations for said initial airfoil shape for air flow in at least one subsonic flow regime.

11. The system of claim 7, wherein said computer is further programmed:

to provide a variation in shape of said final airfoil shape corresponding to variations that can be introduced in manufacture of an airfoil having substantially said final airfoil shape;

to vary said final airfoil shape in a neighborhood of at least one of said perimeter locations according to the manufacturing variations, to provide a perturbed final airfoil shape;

to use computational fluid dynamics ("CFD") to estimate a pressure value at each of at least two selected perimeter locations for the perturbed final airfoil shape; and to provide at least one of an alphanumeric description and a graphical description of the perturbed final airfoil shape.

12. The system of claim 7, wherein said computer is further programmed:

to provide a sequence of N selected spaced apart locations $x_n$ on a perimeter of said airfoil and a line segment, having a length $L \cdot f_n$ and being substantially perpendicular to a curve representing the airfoil perimeter in a neighborhood of each of the locations $x_n$, where L is a chord length of said airfoil and $f_n$ is a fraction lying in a range that is substantially defined by $-0.10 \leq f_n \leq 0.10$, where line segment number n has a first end at the location $x_n$ and has a second end located at a distance $L \cdot f_n$ from the line segment first end (n=1, ..., N); and to define said modified airfoil shape, in part, by a sequence of second ends of the line segments number n=1, ..., N, and to define said modified airfoil shape, in part, by a selected continuous curve connecting the line segments numbers n'−1, n' and n'+1, for n'=1, ..., N−1.

* * * * *